(12) United States Patent
Tsai et al.

(10) Patent No.: US 8,736,986 B2
(45) Date of Patent: May 27, 2014

(54) PHOTOGRAPHING LENS ASSEMBLY

(71) Applicant: Largan Precision Co., Ltd., Taichung (TW)

(72) Inventors: Tsung-Han Tsai, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 55 days.

(21) Appl. No.: 13/646,732

(22) Filed: Oct. 7, 2012

(65) Prior Publication Data
US 2013/0265658 A1     Oct. 10, 2013

(30) Foreign Application Priority Data
Apr. 6, 2012     (TW) .............................. 101112267 A

(51) Int. Cl.
*G02B 9/04*     (2006.01)
*G02B 3/02*     (2006.01)
*G02B 13/00*     (2006.01)

(52) U.S. Cl.
CPC .................................... *G02B 13/003* (2013.01)

USPC .......................................... 359/795; 359/717

(58) Field of Classification Search
USPC ................................. 359/717, 795
See application file for complete search history.

(56) References Cited

U.S. PATENT DOCUMENTS

2012/0257289 A1* 10/2012 Shigemitsu et al. .......... 359/717

* cited by examiner

*Primary Examiner* — William Choi
(74) *Attorney, Agent, or Firm* — CKC & Partners Co., Ltd.

(57) ABSTRACT

A photographing lens assembly includes, in order from an object side to an image side, a first lens element and a second lens element. The first lens element with positive refractive power has an object-side surface and an image-side surface, wherein the object-side surface and the image-side surface of the first lens element are convex at a paraxial region thereof. The second lens element with refractive power is made of plastic material, and has an object-side surface and an image-side surface, wherein the object-side surface of the second lens element is convex at a paraxial region thereof, the image-side surface of the second lens element is concave at the paraxial region and is convex at a peripheral region thereof, and the object-side surface and the image-side surface of the second lens element are aspheric.

10 Claims, 18 Drawing Sheets

PHOTOGRAPHING LENS ASSEMBLY

RELATED APPLICATIONS

The application claims priority to Taiwan Application Serial Number 10112267, filed Apr. 6, 2012, which is herein incorporated by reference.

BACKGROUND

1. Technical Field

The present invention relates to a photographing lens assembly. More to particularly, the present invention relates to a compact photographing lens assembly applicable to electronic products.

2. Description of Related Art

Thin and portable electric devices with a camera lens assembly are widely used, such as smart phones, tablet computers and ultrabooks. For applying to the portable electric devices, the lens assembly with low manufacturing costs and compact size is required. A conventional lens assembly adopts at least three lens elements with refractive power, such as U.S. Pat. No. 8,094,231B2 and U.S. Pat. No. 8,089,704B2. However, it is hard to minimize the size of the lens assembly with the numerous lens elements, the costs, and the complexity of the manufacture of the lens assembly.

Although the lens assembly with two lens elements is disclosed, such as U.S. Pat. No. 7,821,724B2 however, the image formed from the lens assembly is distorted, thus the image is defocused at the peripheral region thereof. Furthermore, corrections against the aberration and the chromatic aberration of the lens assembly would be less than desired due to the lens material thereof. Therefore, the imaging capability of the lens assembly would be limited.

SUMMARY

According to one aspect of the present disclosure, a photographing lens assembly includes, in order from an object side to an image side, a first lens element and a second lens element. The first lens element with positive refractive power has an object-side surface and an image-side surface, wherein the object-side surface and the image-side surface of the first lens element are convex at a paraxial region thereof. The second lens element with refractive power is made of plastic material, and has an object-side surface and an image-side surface, wherein the object-side surface of the second lens element is convex at a paraxial region thereof, the image-side surface of the second lens element is concave at the paraxial region and is convex at a peripheral region thereof, and the object-side surface and the image-side surface of the second lens element are aspheric. When a central thickness of the first lens element is CT1, a central thickness of the second lens element is CT2, an Abbe number of the first lens element is V1, and an Abbe number of the second lens element is V2, the following relationships are satisfied:

$1.30 < CT2/CT1 < 4.0$; and $2.0 < (V1^2 - V2^2)/(V1 - V2)^2 < 5.0$.

According to another aspect of the present disclosure, a photographing lens assembly includes, in order from an object side to an image side, a first lens element and a second lens element. The first lens element with positive refractive power has an object-side surface and an image-side surface, wherein the object-side surface and the image-side surface of the first lens element are convex at a paraxial region thereof. The second lens element with negative refractive power is made of plastic material, and has an object-side surface and an image-side surface, wherein the object-side surface of the second lens element is convex at a paraxial region thereof, the image-side surface of the second lens element is concave at the paraxial region and is convex at a peripheral region thereof, and the object-side surface and the image-side surface of the second lens element are aspheric. When a central thickness of the first lens element is CT1, a central thickness of the second lens element is CT2, an Abbe number of the first lens element is V1, and an Abbe number of the second lens element is V2, the following relationships are satisfied:

$0.60 < CT2/CT1 < 4.0$; and $2.0 < (V1^2 - V2^2)/(V1 - V2)^2 < 5.0$.

According to yet another aspect of the present disclosure, photographing lens assembly includes, in order from an object side to an image side, a first lens element and a second lens element. The first lens element with positive refractive power has an object-side surface and an image-side surface, wherein the object-side surface and the image-side surface of the first lens element are convex at a paraxial region thereof. The second lens element with negative refractive power is made of plastic material, and has an object-side surface and an image-side surface, wherein the object-side surface of the second lens element is convex at a paraxial region thereof, the image-side surface of the second lens element is concave at the paraxial region and is convex at a peripheral region thereof, and the object-side surface and the image-side surface of the second lens element are aspheric. When a central thickness of the first lens element is CT1, and a central thickness of the second lens element is CT2, the following relationship is satisfied:

$1.30 < CT2/CT1 < 4.0$.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
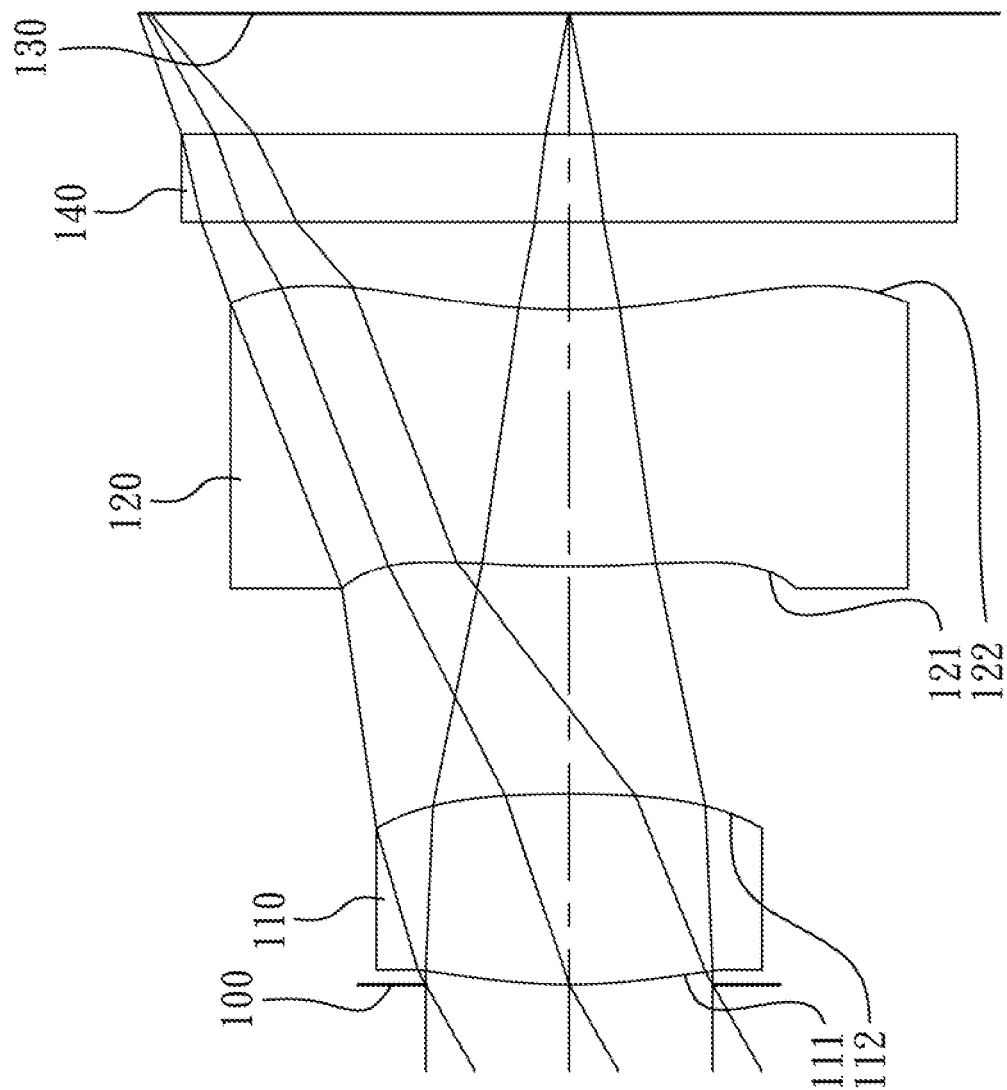
FIG. 1 is a schematic view of a photographing lens assembly according to in the 1st embodiment of the present disclosure.

A photographing lens assembly includes, in order from an object side to an image side, a first lens element and a second lens element.

The first lens element with positive refractive power provides the photographing lens assembly proper positive refractive power. The first lens element has an object-side surface and an image-side surface, wherein the object-side surface and the image-side surface of the first lens element are convex at a paraxial region thereof, so that the total track length of the photographing lens assembly can be reduced by adjusting the positive refractive power of the first lens element.

The second lens element can have negative refractive power for correcting the aberration generated from the first lens element with positive refractive power. The second lens element has an object-side surface and an image-side surface, wherein the object-side surface of the second lens element is convex at a paraxial region thereof, the image-side surface of the second lens element is concave at the paraxial region and is convex at a peripheral region thereof, so that the peripheral defocus of the image generated from the excessive distortion of the photographing lens assembly can be corrected effectively, and the image quality can be enhanced as well.

When a central thickness of the first lens element is CT1, and a central thickness of the second lens element is CT2, the following relationship is satisfied:

$$0.60 < CT2/CT1 < 4.0.$$

Therefore, the thickness of the first lens element and the second lens element are proper for increasing the yield rates of the manufacture of the lens elements. The proper thickness of the lens elements can avoid the problem such as break or bad molds.

CT1 and CT2 can preferably satisfy the following relationship:

$$1.30 < CT2/CT1 < 4.0.$$

Moreover, CT1 and CT2 may satisfy the following relationship:

$$1.50 < CT2/CT1 < 4.0.$$

When an Abbe number of the first lens element is V1, and an Abbe number of the second lens element is V2, the following relationship is satisfied:

$$2.0 < (V1^2 - V2^2)/(V1 - V2)^2 < 5.0.$$

Therefore, the chromatic aberration of the photographing lens assembly can be corrected, and the two-element lens structure of the photographing lens assembly can maintain the compact size and the low costs while retaining high image quality.

V1 and V2 can preferably satisfy the following relationship:

$$2.0 < (V1^2 - V2^2)/(V1 - V2)^2 < 3.0.$$

Moreover, V1 and V2 may satisfy the following relationship:

$$2.0 < (V1^2 - V2^2)/(V1 - V2)^2 < 2.5.$$

When a curvature radius of the object-side surface of the first lens element is R1, and a curvature radius of the image-side surface of the first lens element is R2, the following relationship is satisfied:

$$-1.0 < (R1 + R2)/(R1 - R2) < -0.1.$$

Therefore, the curvature of the object-side surface and the image-side surface of the first lens element are proper for avoiding the excessive spherical aberration generated from the first lens element, and the total track length of the photographing lens assembly can be reduced by adjusting the positive refractive power of the first lens element for applying to the compact electronic product.

R1 and R2 can preferably satisfy the following relationship:

$$-1.0 < (R1 + R2)/(R1 - R2) < -0.25.$$

When a focal length of the photographing lens assembly is f, a focal length of the first lens element is f1, and a focal length of the second lens element is f2, the following relationship is satisfied:

$$0.9 < f/f1 + F/|f2| < 2.1.$$

Therefore, the distribution of the refractive power of the first lens element and the second lens element is proper. When the second lens element has negative refractive power, the aberration generated from the first lens element with positive refractive power can be corrected. When the second lens element has positive refractive power, the distribution of the positive refractive power of the photographing lens assembly can be balanced, so that the sensitivity of the photographing lens assembly can be reduced.

When the focal length of the photographing lens assembly is f, and the focal length of the second lens element is f2, the following relationship is satisfied:

$$-1.0 < f/f2 < 0.5.$$

Therefore, the aberration generated from the first lens element with positive refractive power can be corrected by adjusting the focal length of the second lens element.

f and f2 can preferably satisfy the following relationship:

$$-1.0 < f/f2 < 0.$$

When the curvature radius of the object-side surface of the first lens element is R1, and the focal length of the photographing lens assembly is f, the following relationship is satisfied:

$$0.3 < R1/f < 1.2.$$

Therefore, the refractive power of the first lens element can be maintained for avoiding the excessive aberration of the photographing lens assembly being generated.

According to the photographing lens assembly of the present disclosure, the lens elements thereof can be made of plastic or glass material. When the lens elements are made of plastic material, the costs of manufacture can be effectively reduced. When the lens elements are made of glass material, the distribution of the refractive power of the photographing lens assembly may be more flexible to design. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical system. Therefore, the total track length of the photographing lens assembly can also be reduced.

According to the photographing lens assembly of the present disclosure, the photographing lens assembly can include at least one stop, such as an aperture stop, a glare stop, or a field stop, etc. Said glare stop or said field stop is allocated for reducing stray light while retaining high image quality. Furthermore, when the stop is an aperture stop, the position of the aperture stop within an optical system can be arbitrarily placed in front of the entire lens assembly, within the lens assembly, or in front of the image plane in accordance with the preference of an optical designer, in order to achieve the desirable optical features or higher image quality produced from the optical system.

According to the above description of the present disclosure, the following 1st-9th specific embodiments are provided for further explanation.

1st Embodiment

Figure 2:
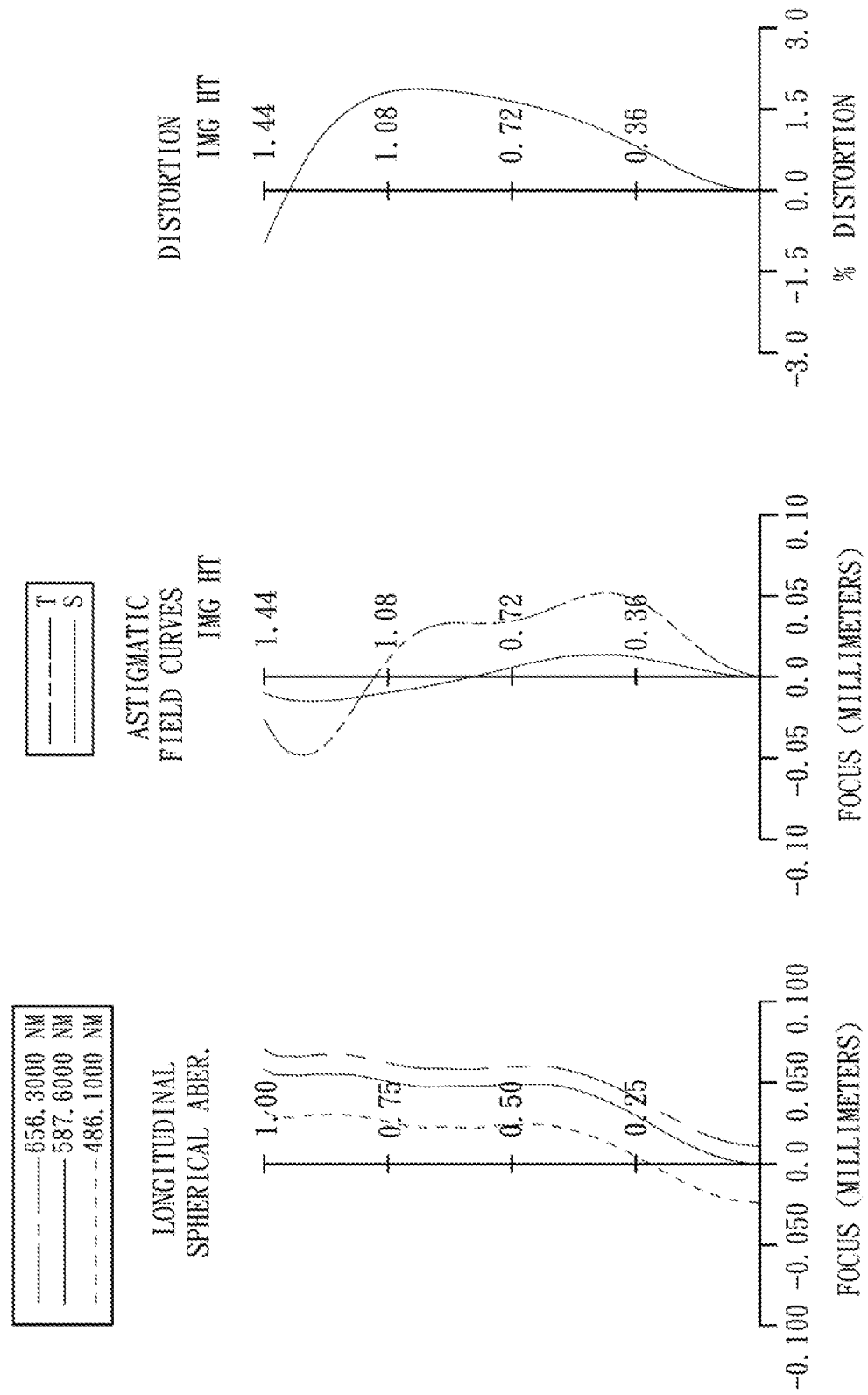
FIG. 2 shows spherical aberration curves, astigmatic field curves and a distortion curve of the photographing lens assembly according to the 1st embodiment.

FIG. 1 schematic view of a photographing lens assembly according to the 1st embodiment of the present disclosure. FIG. 2 shows spherical aberration curves, astigmatic field curves and a distortion curve of the photographing lens assembly according to the 1st embodiment. In FIG. 1, the photographing lens assembly includes, in order from an object side to an image side, an aperture stop 100, the first lens element 110, the second lens element 120, an IR-cut filter 140, and an image plane 130.

The first lens element 110 with positive refractive power has an object-side surface 111 and an image-side surface 112, and is made of plastic material. The object-side surface 111 and the image-side surface 112 of the first lens element 110 are convex at a paraxial region thereof, and the object-side surface 111 and the image-side surface 112 of the first lens element 110 are aspheric.

The second lens element 120 with negative refractive power has an object-side surface 121 and an image-side surface 122, and is made of plastic material. The object-side surface 121 of the second lens element 120 is convex at a paraxial region thereof, the image-side surface 122 of the second lens element 120 is concave at the paraxial region and is convex at a peripheral region thereof, and the object-side surface 121 and the image-side surface 122 of the second lens element 120 are aspheric.

The IR-cut filter 140 is made of glass and located between the second lens element 120 and the image plane 130, and will not affect the focal length of the photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where:

X is the distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the photographing lens assembly according to the 1st embodiment, when a focal length of the photographing lens assembly is f, an f-number of the photographing lens assembly is Fno, and a half of the maximal field of view is HFOV, these parameters have the following values:

f=2.54 mm;
Fno=2.60; and
HFOV=29.4 degrees.

In the photographing lens assembly according to the 1st embodiment, when an Abbe number of the first lens element 110 is V1, and an Abbe number of the second lens element 120 is V2, the following relationship is satisfied:

$$(V1^2 - V2^2)/(V1-V2)^2 = 2.24.$$

In the photographing lens assembly according to the 1st embodiment, when a central thickness of the first lens element 110 is CT1, and central thickness of the second lens element 120 is CT2, the following relationship is satisfied:

$$CT2/CT1=1.35.$$

In the photographing lens assembly according to the 1st embodiment, when the focal length of the photographing lens assembly is f, a curvature radius of the object-side surface 111 of the first lens element 110 is R1 and a curvatures radius of the mage-side surface 112 of the first lens element 110 is R2, the following relationships are satisfied:

$$R1/f=0.81;\text{ and}$$

$$(R1+R2)/(R1-R2)=-0.31$$

In the photographing lens assembly according to the 1st embodiment, when the focal length of the photographing lens assembly is f, a focal length of the first lens element 110 is f1, and a focal length of the second lens element 120 is f2, the following relationships are satisfied:

$$f/f2=-0.16;\text{ and}$$

$$|f/f1+f/f2|=1.12.$$

The detailed optical data of the 1st embodiment are shown in Table 1, and the aspheric surface data are shown in Table 2 below.

TABLE 1

1st Embodiment
f = 2.54 mm, Fno = 2.60, HFOV = 29.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.000 | | | | |
| 2 | Lens 1 | 2.069 (ASP) | 0.650 | Plastic | 1.530 | 55.8 | 2.66 |
| 3 | | −3.958 (ASP) | 0.775 | | | | |
| 4 | Lens 2 | 3.409 (ASP) | 0.875 | Plastic | 1.650 | 21.4 | −15.73 |
| 5 | | 2.298 (ASP) | 0.300 | | | | |
| 6 | IR-cut filter | Plano | 0.300 | Glass | 1.517 | 64.2 | — |
| 7 | | Plano | 0.412 | | | | |
| 8 | Image | Plano | — | | | | |

Note:
Reference wavelength (d-line) is 587.6 nm.

TABLE 2

Aspheric Coefficients

| | Surface # | | | |
|---|---|---|---|---|
| | 2 | 3 | 4 | 5 |
| k = | −1.0000E+00 | −1.0000E+00 | −1.0000E+00 | 2.2773E+00 |
| A4 = | −2.7864E−01 | −2.3375E−01 | −4.4875E−01 | −1.3478E−01 |
| A6 = | 2.0501E+00 | −6.2056E−01 | 1.4186E+00 | 1.9078E−01 |
| A8 = | −1.6045E+01 | 2.9568E+00 | −8.4686E+00 | 3.3833E−01 |
| A10 = | 5.2937E+01 | −8.2203E+00 | 2.5026E+01 | −3.4614E−01 |
| A12 = | −6.8319E+01 | 7.7305E+00 | −3.7737E+01 | 1.7063E−01 |
| A14 = | | | 2.1516E+01 | −3.5380E−02 |

In Table 1, the curvature radius, the thickness and the focal length are in shown in millimeters (mm). Surface numbers 0-8 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
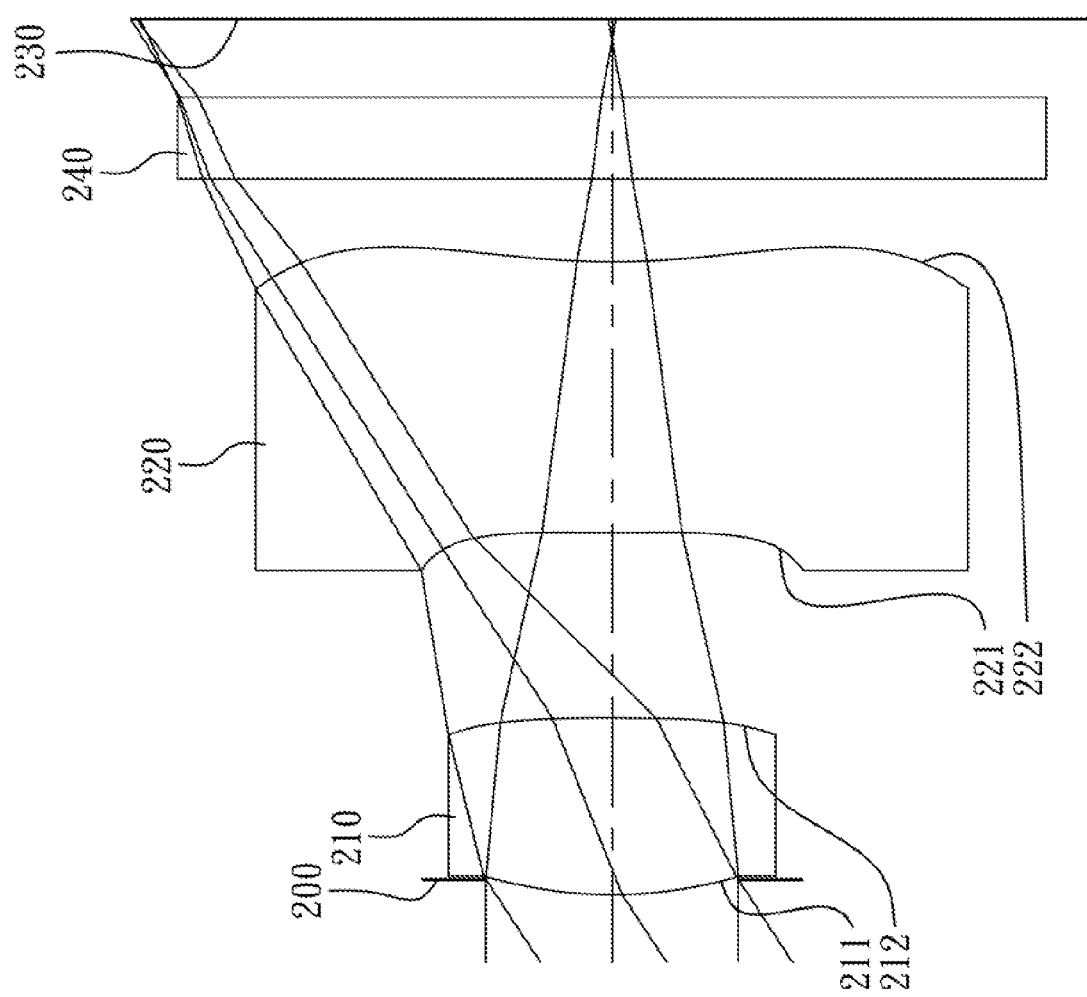
FIG. 3 is a schematic view of a photographing lens assembly according to the 2nd embodiment of the present disclosure.
Figure 4:
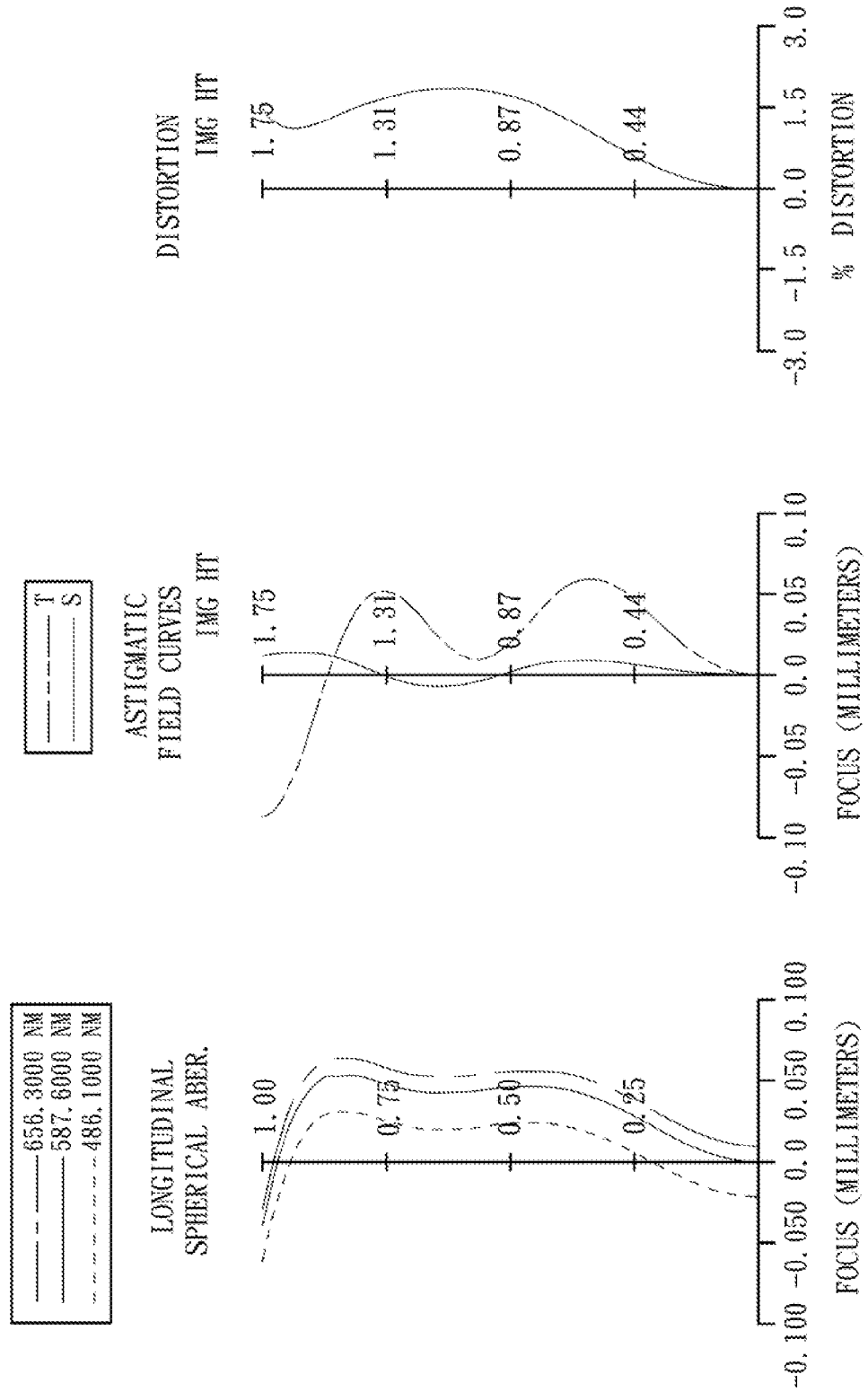
FIG. 4 shows spherical aberration curves, astigmatic field curves and a distortion curve of the photographing lens assembly according to the 2nd embodiment.

FIG. 3 is a schematic view of a photographing lens assembly according to the 2nd embodiment of the present disclosure. FIG. 4 shows spherical aberration curves, astigmatic field curves and a distortion curve of the photographing lens assembly according to the 2nd embodiment. In FIG. 3, the photographing lens assembly includes, in order from an object side to an image side, an aperture stop 200, the first lens element 210, the second lens element 220, an IR-cut filter 240, and an image plane 230.

The first lens element 210 with positive refractive power has an object-side surface 211 and an image-side surface 212, and is made of plastic material. The object-side surface 211 and the image-side surface 212 of the first lens element 210 are convex at a paraxial region thereof, and the object-side surface 211 and the image-side surface 212 of the first lens element 210 are aspheric.

The second lens element 220 with negative refractive power has an object-side surface 221 and an image-side surface 222, and is made of plastic material. The object-side surface 221 of the second lens element 220 is convex at a paraxial region thereof, the image-side surface 222 of the second lens element 220 is concave at the paraxial region and is convex at a peripheral region thereof, and the object-side surface 221 and the image-side surface 222 of the second lens element 220 are aspheric.

The IR-cut filter 240 is made of glass and located between the second lens element 220 and the image plane 230, and will not affect the focal length of the photographing lens assembly.

The detailed optical data of the 2nd embodiment are shown in Table 3, and the aspheric surface data are shown in Table 4 below

TABLE 3

2nd Embodiment
f = 2.57 mm, Fno = 2.80, HFOV = 33.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.056 | | | | |
| 2 | Lens 1 | 1.507 (ASP) | 0.647 | Plastic | 1.544 | 55.9 | 2.36 |
| 3 | | −7.407 (ASP) | 0.673 | | | | |
| 4 | Lens 2 | 10.972 (ASP) | 0.987 | Plastic | 1.640 | 23.3 | −6.04 |
| 5 | | 2.759 (ASP) | 0.300 | | | | |
| 6 | IR-cut filter | Plano | 0.300 | Glass | 1.517 | 64.2 | — |
| 7 | | Plano | 0.284 | | | | |
| 8 | Image | Plano | — | | | | |

Note:
Reference wavelength (d-line) is 587.6 nm.

TABLE 4

Aspheric Coefficients

| | Surface # | | | |
|---|---|---|---|---|
| | 2 | 3 | 4 | 5 |
| k = | −8.0753E−01 | 0.0000E+00 | 0.0000E+00 | 6.4531E−01 |
| A4 = | −2.2441E−01 | −1.8039E−01 | −5.1489E−01 | −2.0233E−01 |
| A6 = | 2.5258E+00 | −5.0889E−01 | −2.6634E−01 | 1.4108E−01 |
| A8 = | −1.8550E+01 | 8.8276E−01 | 7.4862E+00 | −1.9887E−01 |
| A10 = | 5.2727E+01 | −9.2141E−01 | −4.3816E+01 | 1.5640E−01 |
| A12 = | −4.4931E+01 | −1.1009E+00 | 9.6115E+01 | −6.2126E−02 |
| A14 = | 6.0882E−09 | 9.4253E−09 | −7.8405E+01 | 7.8267E−03 |
| A16 = | | | −2.5782E+00 | 8.7391E−04 |

In the photographing lens assembly according to the 2nd embodiment, the definitions of f, Fno, HFOV, V1, V2, CT1, CT2, R1, R2, f1, and f2 are the same as those stated in the 1st embodiment with corresponding values for the 2nd embodiment. Moreover, these parameters can be calculated from Table 3 and Table 4 as the following values and satisfy the following relationships:

| | | | | |
|---|---|---|---|---|
| f (mm) | 2.57 | R1/f | 0.59 |
| Fno | 2.80 | (R1 + R2)/(R1 − R2) | −0.66 |
| HFOV (deg.) | 33.5 | f/f2 | −0.43 |
| $(V1^2 − V2^2)/(V1 − V2)^2$ | 2.43 | f/f1 + f/|f2| | 1.51 |
| CT2/CT1 | 1.53 | | |

3rd Embodiment

Figure 5:
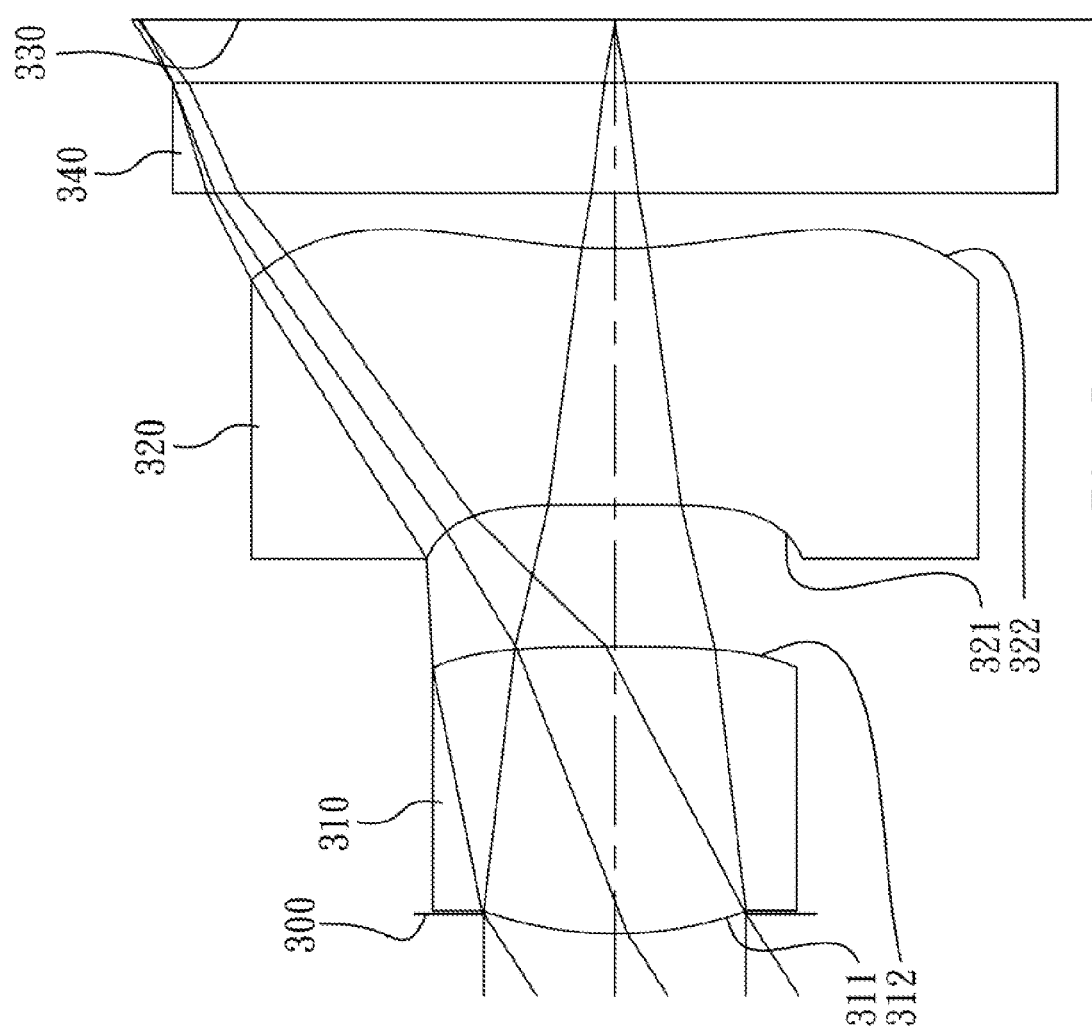
FIG. 5 is a schematic view of a photographing lens assembly according to the 3rd embodiment of the present disclosure.
Figure 6:
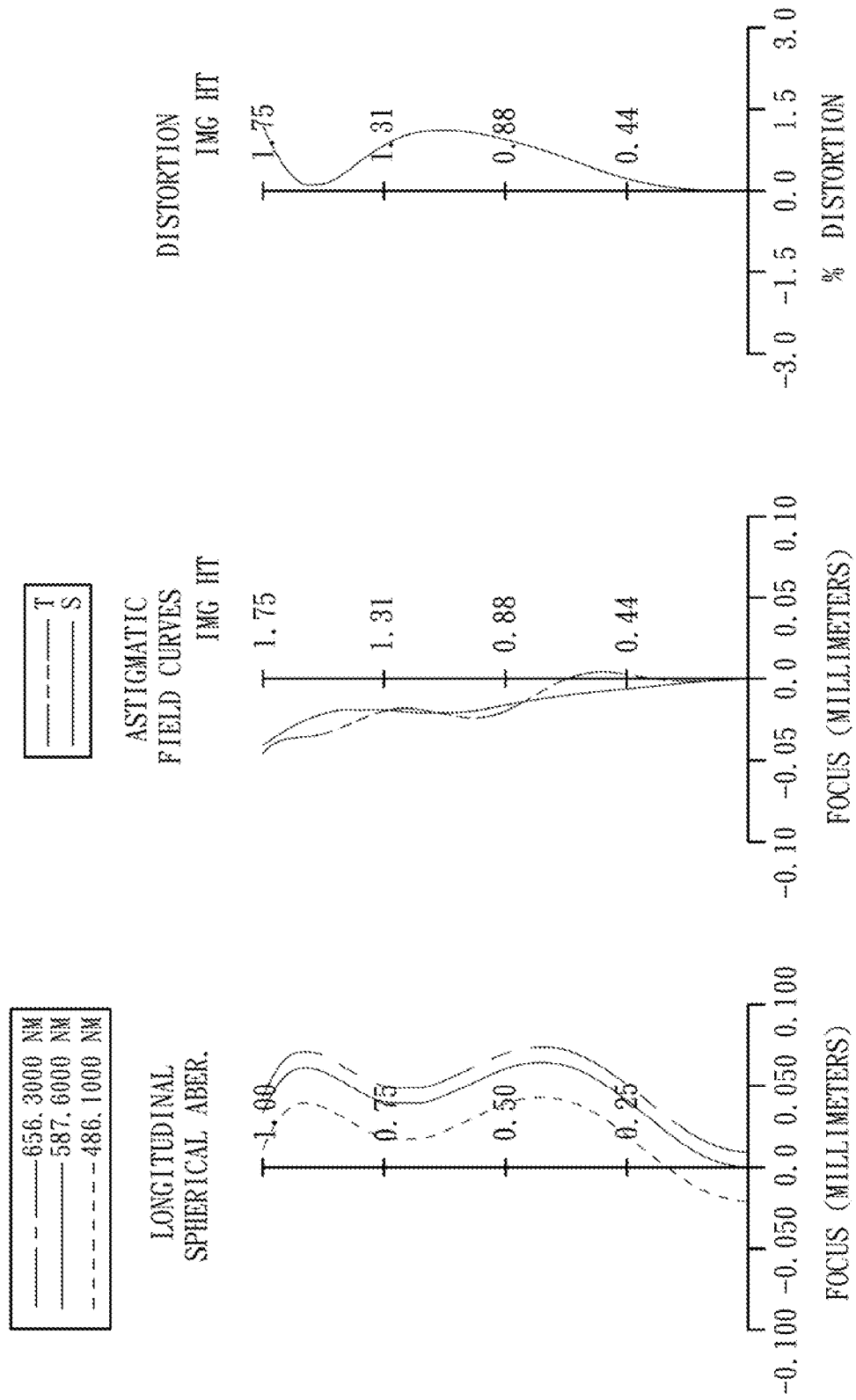
FIG. 6 shows spherical aberration curves, astigmatic field curves and a distortion curve of the photographing lens assembly according to the 3rd embodiment.

FIG. 5 is a schematic view of a photographing lens assembly according to the 3rd embodiment of the present disclosure. FIG. 6 shows spherical aberration curves, astigmatic field curves and a distortion curve of the photographing lens assembly according to the 3rd embodiment. In FIG. 5, the photographing lens assembly includes, in order from an object side to an image side, an aperture stop 300, the first lens element 310, the second lens element 320, an IR-cut filter 340, and an image plane 330.

The first lens element 310 with positive refractive power has an object-side surface 311 and an image-side surface 312, and is made of plastic material. The object-side surface 311 and the image-side surface 312 of the first lens element 310 are convex at a paraxial region thereof, and the object-side surface 311 and the image-side surface 312 of the first lens element 310 are aspheric.

The second lens element 320 with negative refractive power has an object-side surface 321 and an image-side surface 322, and is made of plastic material. The object-side surface 321 of the second lens element 320 is convex at a paraxial region thereof, the image-side surface 322 of the second lens element 320 is concave at the paraxial region and is convex at a peripheral region thereof, and the object-side surface 321 and the image-side surface 322 of the second lens element 320 are aspheric.

The IR-cut filter 340 is made of glass and located between the second lens element 320 and the image plane 330, and will not affect the focal length of the photographing lens assembly.

The detailed optical data of the 3rd embodiment are shown in Table 5, and the aspheric surface data are shown in Table 6 below.

TABLE 5

3rd Embodiment
f = 2.66 mm, Fno = 2.80, HFOV = 32.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.073 | | | | |
| 2 | Lens 1 | 1.344 (ASP) | 1.040 | Plastic | 1.544 | 55.9 | 2.27 |
| 3 | | −10.862 (ASP) | 0.514 | | | | |
| 4 | Lens 2 | 28.710 (ASP) | 0.933 | Plastic | 1.640 | 23.3 | −3.47 |
| 5 | | 2.032 (ASP) | 0.200 | | | | |
| 6 | IR-cut filter | Plano | 0.400 | Glass | 1.517 | 64.2 | — |
| 7 | | Plano | 0.229 | | | | |
| 8 | Image | Plano | — | | | | |

Note:
Reference wavelength (d-line) is 587.6 nm.

TABLE 6

Aspheric Coefficients

| | Surface # | | | |
|---|---|---|---|---|
| | 2 | 3 | 4 | 5 |
| k = | −2.1866E+00 | −3.0000E+01 | 3.0000E+01 | −5.9694E+00 |
| A4 = | −2.1322E−01 | −3.2361E−01 | −5.7823E−01 | −2.3683E−01 |
| A6 = | 3.4377E+00 | 6.9639E−01 | −8.7973E−01 | 2.1074E−01 |
| A8 = | −2.0173E+01 | −2.5046E+00 | 8.9340E+00 | −2.1459E−01 |
| A10 = | 5.1391E+01 | 2.9469E+00 | −4.4576E+01 | 1.3497E−01 |
| A12 = | −4.4781E+01 | −1.5102E+00 | 9.7113E+01 | −5.2349E−02 |
| A14 = | | | −8.8882E+01 | 9.2034E−03 |

In the photographing lens assembly according to the 3rd embodiment, the definitions of f, Fno, HFOV, V1, V2, CT1, CT2, R1, R2, f1, and f2 are the same as those stated in the 1st embodiment with corresponding values for the 3rd embodiment. Moreover, these parameters can be calculated from Table 5 and Table 6 as the following values and satisfy the following relationships:

| f (mm) | 2.47 | R1/f | 0.61 |
|---|---|---|---|
| Fno | 2.80 | (R1 + R2)/(R1 − R2) | −0.45 |
| HFOV (deg.) | 34.1 | f/f2 | −0.74 |
| $(V1^2 - V2^2)/(V1 - V2)^2$ | 3.35 | f/f1 + f/|f2| | 1.89 |
| CT2/CT1 | 0.72 | | |

TABLE 8

Aspheric Coefficients

| | Surface # | | | |
|---|---|---|---|---|
| | 1 | 2 | 4 | 5 |
| k = | −5.2140E+00 | −4.2571E+01 | 3.7591E+01 | −1.0535E+00 |
| A4 = | −5.1365E−02 | −3.3826E−01 | −3.9923E−01 | −4.6886E−02 |
| A6 = | −1.6723E−01 | −2.5962E−01 | 1.0955E+00 | −6.0690E−02 |
| A8 = | −2.9197E−01 | 2.0862E−01 | −8.5449E+00 | 5.9270E−02 |
| A10 = | 4.9325E−01 | 2.0296E+00 | 2.6735E+01 | −2.8529E−02 |
| A12 = | −5.3720E−01 | −3.2927E+00 | −3.4344E+01 | 2.5872E−05 |
| A14 = | | | | 2.1878E−03 |

| f (mm) | 2.66 | R1/f | 0.51 |
|---|---|---|---|
| Fno | 2.80 | (R1 + R2)/(R1 − R2) | −0.78 |
| HFOV (deg.) | 32.6 | f/f2 | −0.77 |
| $(V1^2 - V2^2)/(V1 - V2)^2$ | 2.43 | f/f1 + f/|f2| | 1.94 |
| CT2/CT1 | 0.90 | | |

4th Embodiment

Figure 7:
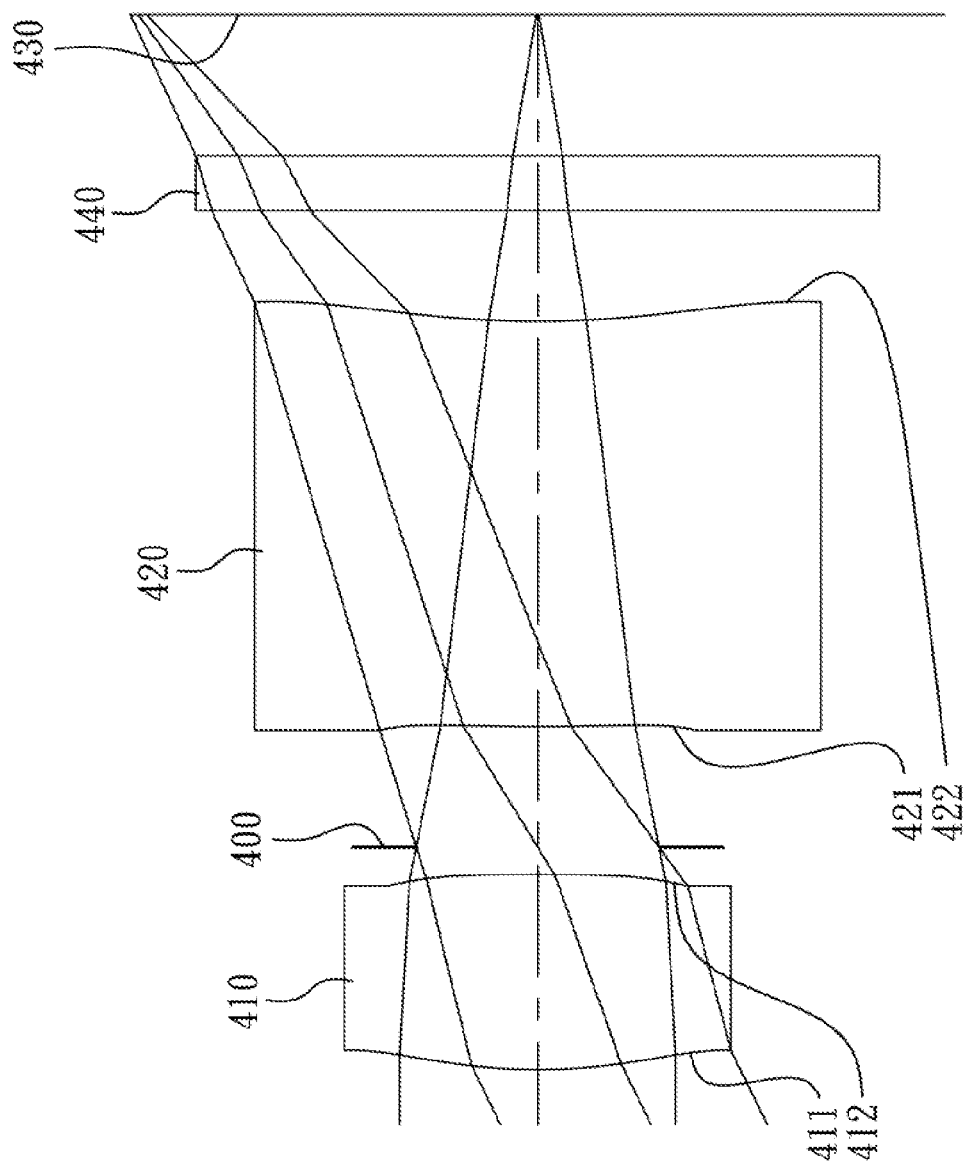
FIG. 7 is a schematic view of a photographing lens assembly according to the 4th embodiment of the present disclosure.
Figure 8:
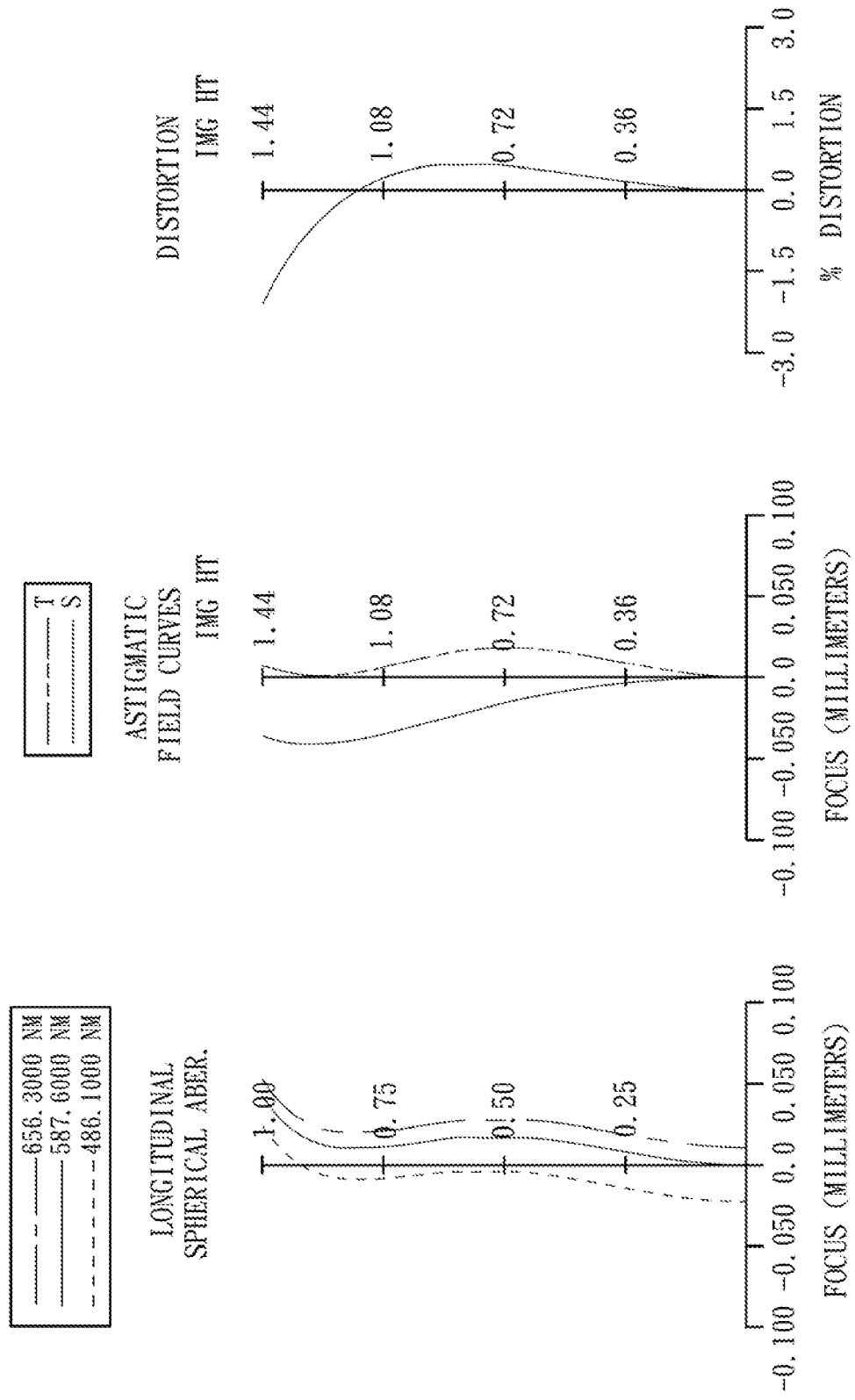
FIG. 8 shows spherical aberration curves, astigmatic field curves and a distortion curve of the photographing lens assembly according to the 4th embodiment.

FIG. 7 is a schematic view of a photographing lens assembly according to the 4th embodiment of the present disclosure. FIG. 8 shows spherical aberration curves, astigmatic field curves and a distortion curve of the photographing lens assembly according to the 4th embodiment. In FIG. 7, the photographing lens assembly includes, in order from an object side to an image side, the first lens element 410, an aperture stop 400, the second lens element 420, an IR-cut filter 440, and an image plane 430.

The first lens element 410 with positive refractive power has an object-side surface 411 and an image-side surface 412, and is made of glass material. The object-side surface 411 and the image-side surface 412 of the first lens element 410 are convex at a paraxial region thereof, and the object-side surface 411 and the image-side surface 412 of the first lens element 410 are aspheric.

The second lens element 420 with negative refractive power has an object-side surface 421 and an image-side surface 422, and is made of plastic material. The object-side surface 421 of the second lens element 420 is convex at a paraxial region thereof, the image-side surface 422 of the second lens element 420 is concave at the paraxial region and is convex at a peripheral region thereof, and the object-side surface 421 and the image-side surface 422 of the second lens element 420 are aspheric.

The IR-cut filter 440 is made of glass and located between the second lens element 420 and the image plane 430, and will not affect the focal length of the photographing lens assembly.

The detailed optical data of the 4th embodiment are shown in Table 7, and the aspheric surface data are shown in Table 8 below.

In the photographing lens assembly according to the 4th embodiment, the definitions of f, Fno, HFOV, V1, V2, CT1, CT2, R1, R2, f1, and f2 are the same as those stated in the 1st embodiment with corresponding values for the 4th embodiment. Moreover, these parameters can be calculated from Table 7 and Table 8 as the following values and satisfy the following relationships:

| f (mm) | 2.99 | R1/f | 0.67 |
|---|---|---|---|
| Fno | 3.00 | (R1 + R2)/(R1 − R2) | −0.74 |
| HFOV (deg.) | 26.1 | f/f2 | −0.18 |
| $(V1^2 - V2^2)/(V1 - V2)^2$ | 2.08 | f/f1 + f/|f2| | 1.14 |
| CT2/CT1 | 2.08 | | |

5th Embodiment

Figure 9:
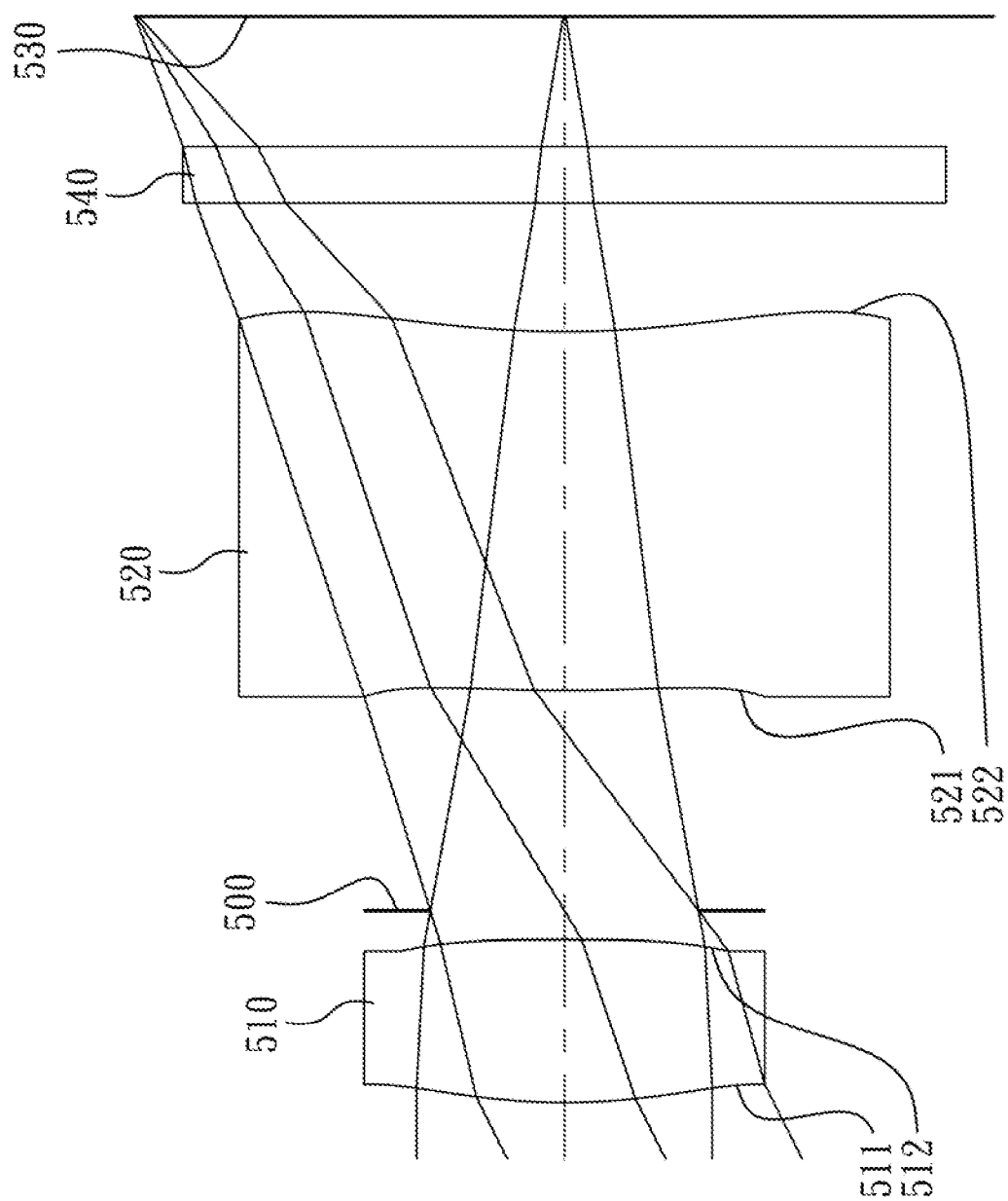
FIG. 9 is a schematic view of a photographing lens assembly according to the 5th embodiment of the present disclosure.
Figure 10:
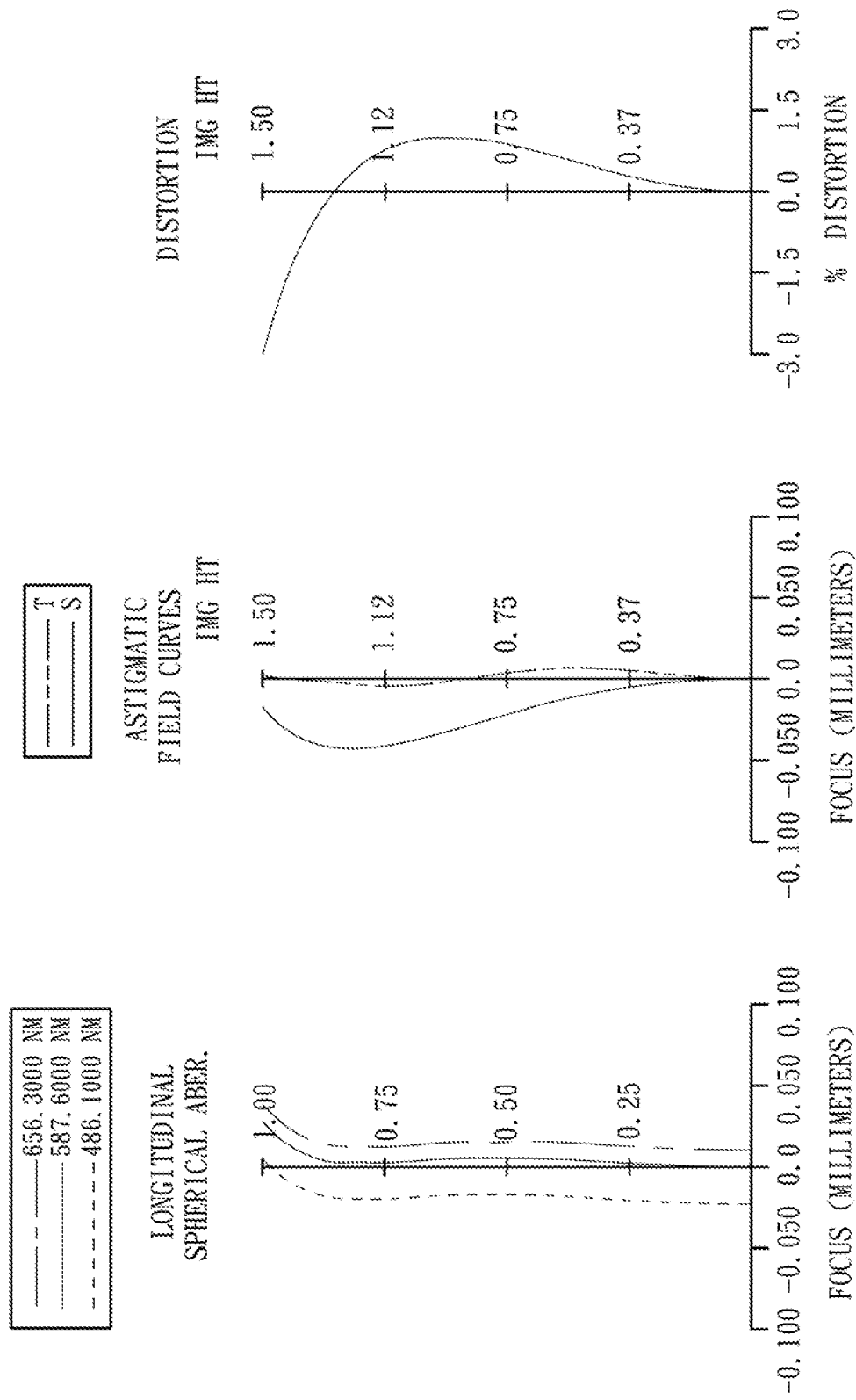
FIG. 10 shows spherical aberration curves, astigmatic field curves and a distortion curve of the photographing lens assembly according to the 5th embodiment.

FIG. 9 is a schematic view of a photographing lens assembly according to to the 5th embodiment of the present disclosure. FIG. 10 shows spherical aberration curves, astigmatic field curves and a distortion curve of the photographing lens assembly according to the 5th embodiment. In FIG. 9, the photographing lens assembly includes, in order from an object side to an image side, the first lens element 510, an aperture stop 500, the second lens element 520, an IR-cut filter 540, and an image plane 530.

The first lens element 510 with positive refractive power has an object-side surface 511 and an image-side surface 512, and is made of glass material. The object-side surface 511 and the image-side surface 512 of the first lens element 510 are convex at a paraxial region thereof, and the object-side surface 511 and the image-side surface 512 of the first lens element 510 are aspheric.

The second lens element 520 with negative refractive power has an object-side surface 521 and an image-side surface 522, and is made of plastic material. The object-side surface 521 of the second lens element 520 is convex at a paraxial region thereof, the image-side surface 522 of the second lens element 520 is concave at the paraxial region and is convex at a peripheral region thereof, and the object-side surface 521 and the image-side surface 522 of the second lens element 520 are aspheric.

The IR-cut filter 540 is made of glass and located between the second lens element 520 and the image plane 530, and will not affect the focal length of the photographing lens assembly.

The detailed optical data of the 5th embodiment are shown in Table 9, and the aspheric surface data are shown in Table 10 below.

TABLE 9

5th Embodiment
f = 3.11 mm, Fno = 3.00, HFOV = 26.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.178 (ASP) | 0.570 | Glass | 1.592 | 68.4 | 3.20 |
| 2 | | −13.147 (ASP) | 0.100 | | | | |
| 3 | Ape. Stop | Plano | 0.772 | | | | |
| 4 | Lens 2 | 5.613 (ASP) | 1.258 | Plastic | 1.634 | 23.8 | −17.94 |
| 5 | | 3.431 (ASP) | 0.450 | | | | |
| 6 | IR-cut filter | Plano | 0.200 | Glass | 1.517 | 64.2 | — |
| 7 | | Plano | 0.456 | | | | |
| 8 | Image | Plano | — | | | | |

Note:
Reference wavelength (d-line) is 587.6 nm.

TABLE 10

Aspheric Coefficients

| | Surface # | | | |
|---|---|---|---|---|
| | 1 | 2 | 4 | 5 |
| k = | −7.4638E+00 | −8.2608E+01 | 4.7616E+01 | −2.3639E+00 |
| A4 = | −3.8849E−02 | −2.2290E−01 | −2.3509E−01 | −3.5376E−02 |
| A6 = | −1.3785E−01 | −9.2221E−02 | 4.4553E−02 | −7.7705E−02 |
| A8 = | −3.1973E−01 | −6.4812E−01 | −1.0146E+00 | 7.2255E−02 |
| A10 = | 7.0074E−01 | 3.2215E+00 | 2.6667E+00 | −5.0322E−02 |
| A12 = | −9.3034E−01 | −4.0775E+00 | −4.1085E+00 | 1.8638E−02 |
| A14 = | 4.0173E−01 | −2.6564E−06 | 1.6653E+00 | −3.2791E−03 |
| A16 = | | | | 1.4621E−04 |

In the photographing lens assembly according to the 5th embodiment, the definitions of f, Fno, HFOV, V1, V2, CT1, CT2, R1, R2, f1, and f2 are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 3.11 | R1/f | 0.70 |
| Fno | 3.00 | (R1 + R2)/(R1 − R2) | −0.72 |
| HFOV (deg.) | 26.5 | f/f2 | −0.17 |
| $(V1^2 - V2^2)/(V1 - V2)^2$ | 2.07 | f/f1 + f/|f2| | 1.14 |
| CT2/CT1 | 2.21 | | |

6th Embodiment

Figure 11:
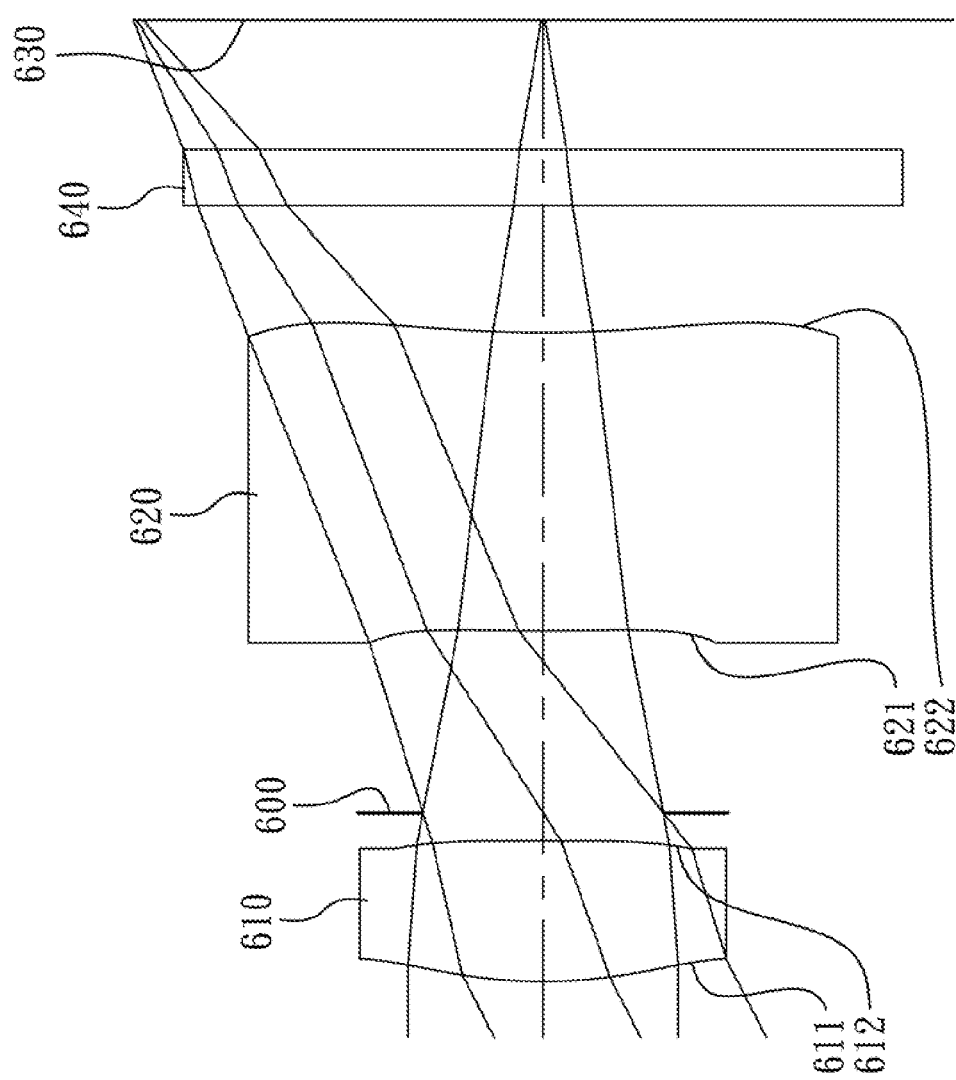
FIG. 11 is a schematic view of a photographing lens assembly according to the 6th embodiment of the present disclosure.
Figure 12:
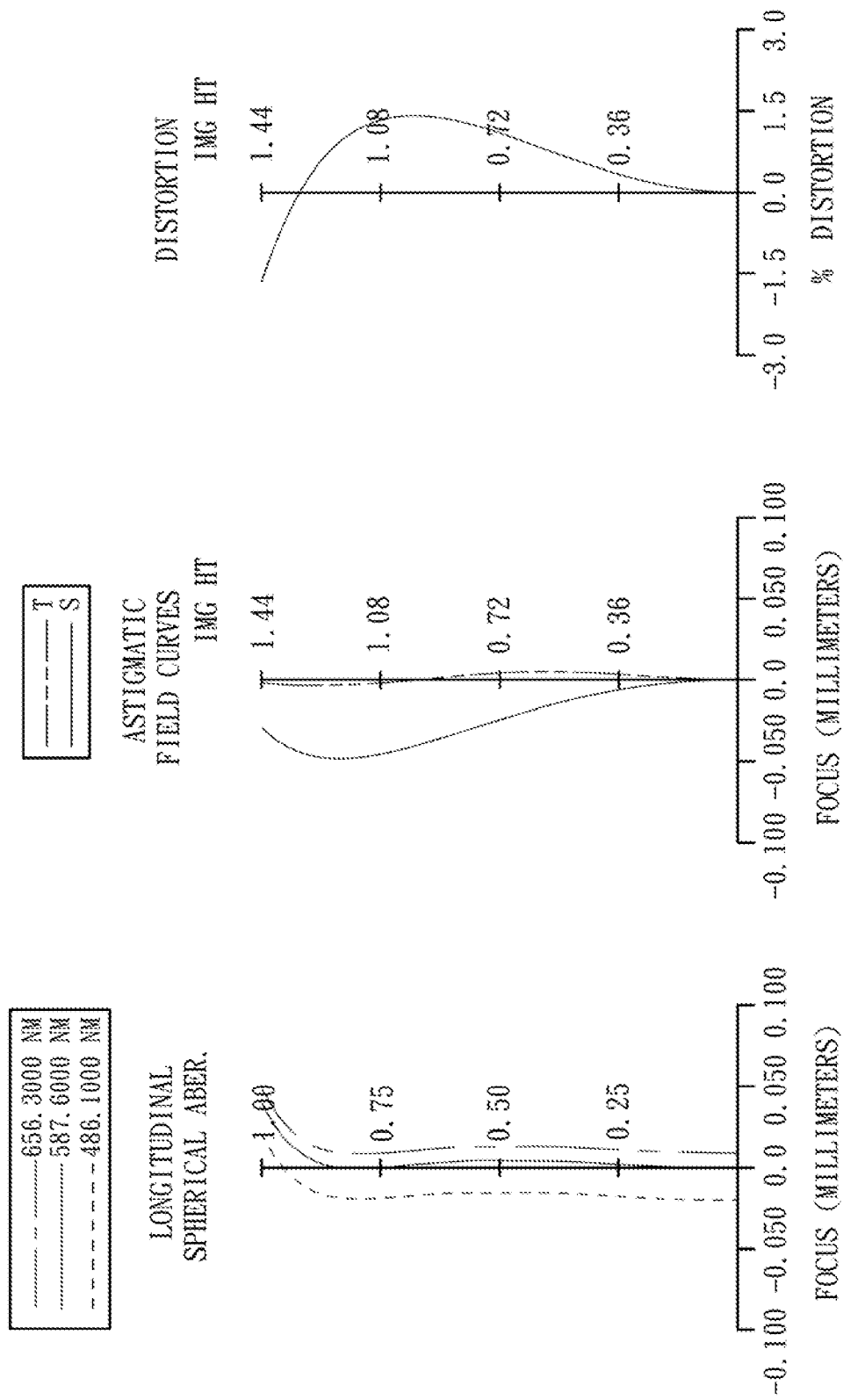
FIG. 12 shows spherical aberration curves, astigmatic field curves and a distortion curve of the photographing lens assembly according to the 6th embodiment.

FIG. 11 is a schematic view of a photographing lens assembly according to the 6th embodiment of the present disclosure. FIG. 12 shows spherical aberration curves, astigmatic field curves and a distortion curve of the photographing lens assembly according to the 6th embodiment. In FIG. 11, the photographing lens assembly includes, in order from an object side to an image side, the first lens element 610, an aperture stop 600, the second lens element 620, an IR-cut filter 640, and an image plane 630.

The first lens element 610 with positive refractive power has an object-side surface 611 and an image-side surface 612, and is made of glass material. The object-side surface 611 and the image-side surface 612 of the first lens element 610 are convex at a paraxial region thereof, and the object-side surface 611 and the image-side surface 612 of the first lens element to 610 are aspheric.

The second lens element 620 with negative refractive power has an object-side surface 621 and an image-side surface 622, and is made of plastic material. The object-side surface 621 of the second lens element 620 is convex at a paraxial region thereof, the image-side surface 622 of the second lens element 620 is concave at the paraxial region and is convex at a peripheral region thereof, and the object-side surface 621 and the image-side surface 622 of the second lens element 620 are aspheric.

The IR-cut filter 640 is made of glass and located between the second lens element 620 and the image plane 630, and will not affect the focal length of the photographing lens assembly.

The detailed optical data of the 6th embodiment are shown in Table 11, and the aspheric surface data are shown in Table 12 below.

TABLE 11

6th Embodiment
f = 2.87 mm, Fno = 3.00, HFOV = 27.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.675 (ASP) | 0.499 | Glass | 1.592 | 68.4 | 279 |
| 2 | | −100.000 (ASP) | 0.100 | | | | |
| 3 | Ape. Stop | Plano | 0.645 | | | | |
| 4 | Lens 2 | 9.398 (ASP) | 1.056 | Plastic | 1.634 | 23.8 | −14.42 |
| 5 | | 4.433 (ASP) | 0.450 | | | | |
| 6 | IR-cut filter | Plano | 0.200 | Glass | 1.517 | 64.2 | — |
| 7 | | Plano | 0.457 | | | | |
| 8 | Image | Plano | — | | | | |

Note:
Reference wavelength (d-line) is 587.6 nm.

TABLE 12

Aspheric Coefficients

| | Surface # | | | |
|---|---|---|---|---|
| | 1 | 2 | 4 | 5 |
| k = | −4.8536E+00 | 5.0000E+01 | −4.9133E+01 | −2.9209E−01 |
| A4 = | −2.9274E−02 | −2.8652E−01 | −2.7943E−01 | −5.4008E−02 |
| A6 = | −2.1279E−01 | −2.3473E−01 | −8.1656E−02 | −1.0497E−01 |
| A8 = | −4.2990E−01 | −6.2913E−01 | −1.1884E+00 | 8.6979E−02 |
| A10 = | 6.2622E−01 | 3.7700E+00 | 3.1030E+00 | −5.4904E−02 |
| A12 = | −1.5695E+00 | −2.9803E+00 | −4.4078E+00 | 1.5792E−02 |
| A14 = | 2.0042E+00 | −1.2483E−05 | −4.3510E+00 | −2.6208E−03 |
| A16 = | | | | 2.2486E−04 |

In the photographing lens assembly according to the 6th embodiment, the definitions of f, Fno, HFOV, V1, V2, CT1, CT2, R1, R2, f1, and f2 are the same as those stated in the 1st embodiment with corresponding values for the 6th embodiment. Moreover, these parameters can be calculated from Table 11 and Table 12 as the following values and satisfy the following relationships:

| f (mm) | 2.87 | R1/f | 0.59 |
|---|---|---|---|
| Fno | 3.00 | (R1 + R2)/(R1 − R2) | −0.97 |
| HFOV (deg.) | 27.1 | f/f2 | −0.20 |
| $(V1^2 - V2^2)/(V1 - V2)^2$ | 2.07 | $f/f1 + f/|f2|$ | 1.23 |
| CT2/CT1 | 2.12 | | |

7th Embodiment

Figure 13:
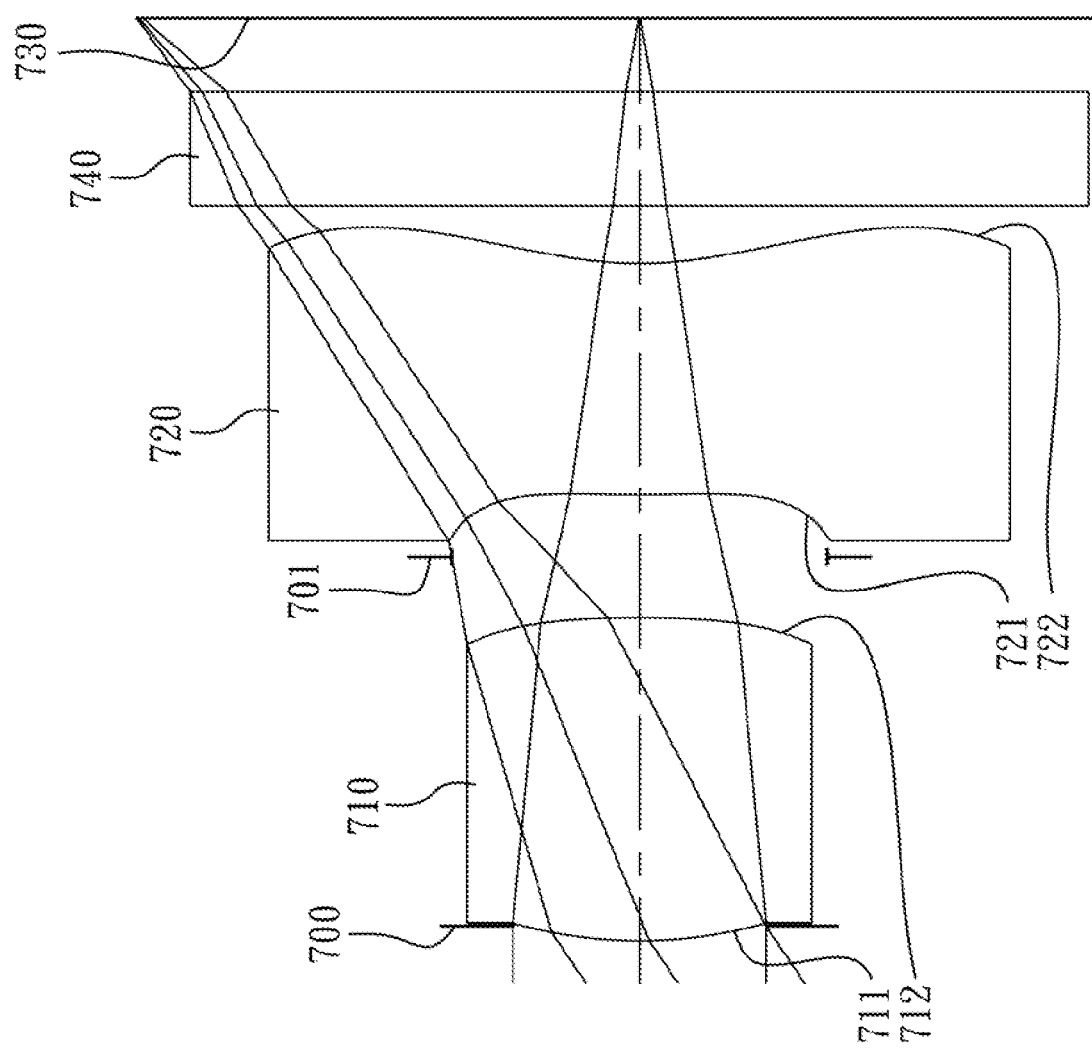
FIG. 13 is a schematic view of a photographing lens assembly according to the 7th embodiment of the present disclosure.
Figure 14:
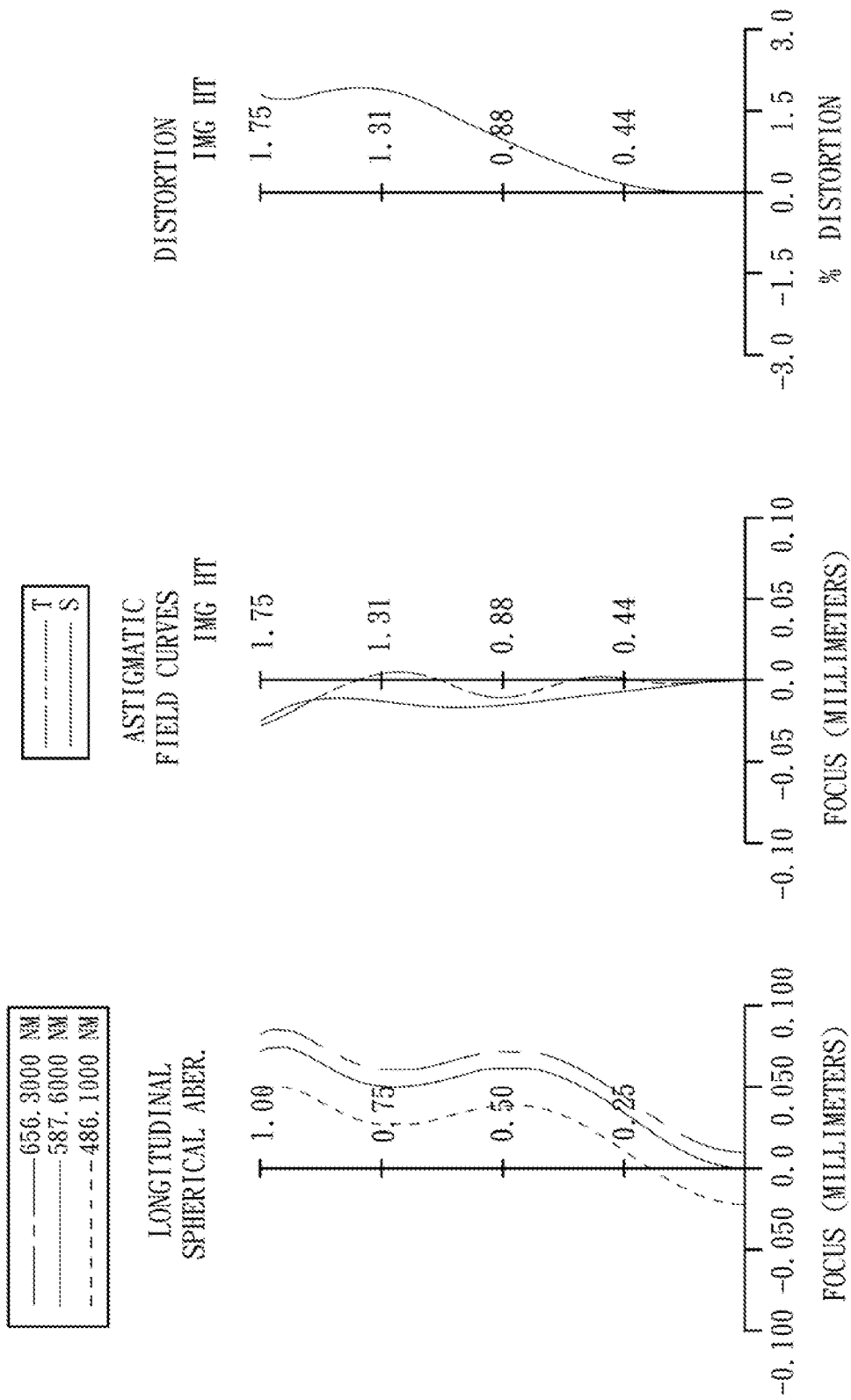
FIG. 14 shows spherical aberration curves, astigmatic field curves and a distortion curve of the photographing lens assembly according to the 7th embodiment.

FIG. 13 is a schematic view of a photographing lens assembly according to the 7th embodiment of the present disclosure. FIG. 14 shows spherical aberration curves, astigmatic field curves and a distortion curve of the photographing lens assembly according to the 7th embodiment. In FIG. 13, the photographing lens assembly includes, in order from an object side to an image side, an aperture stop 700, the first lens element 710, a stop 701, the second lens element 720, an IR-cut filter 740, and an image plane 730.

The first lens element 710 with positive refractive power has an object-side surface 711 and an image-side surface 712, and is made of plastic material. The object-side surface 711 and the image-side surface 712 of the first lens element 710 are convex at a paraxial region thereof, and the object-side surface 711 and the image-side surface 712 of the first lens element 710 are aspheric.

The second lens element 720 with negative refractive power has an object-side surface 721 and an image-side surface 722, and is made of plastic aterial. The object-side surface 721 of the second lens element 720 is convex at a paraxial region thereof, the image-side surface 722 of the second lens element 720 is concave at the paraxial region and is convex at a peripheral region thereof, and the object-side surface 721 and the image-side surface 722 of the second lens element 720 are aspheric.

The IR-cut filter 740 is made of glass and located between the second lens element 720 and the image plane 730, and will not affect the focal length of the photographing lens assembly.

The detailed optical data of the 7th embodiment are shown in Table 13, and the aspheric surface data are shown in Table 14 below.

TABLE 13

7th Embodiment
f = 2.47 mm, Fno = 2.80, HFOV = 34.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.052 | | | | |
| 2 | Lens 1 | 1.501 (ASP) | 1.130 | Plastic | 1.544 | 55.9 | 2.16 |
| 3 | | −3.951 (ASP) | 0.210 | | | | |
| 4 | Stop | Plano | 0.220 | | | | |
| 5 | Lens 2 | 5.549 (ASP) | 0.808 | Plastic | 1.583 | 30.2 | −3.34 |
| 6 | | 1.363 (ASP) | 0.200 | | | | |
| 7 | IR-cut filter | Plano | 0.400 | Glass | 1.517 | 64.2 | — |
| 8 | | Plano | 0.258 | | | | |
| 9 | Image | Plano | — | | | | |

Note:
Reference wavelength (d-line) is 587.6 nm.
Effective radius of Surface 4 is 0.656 mm.

TABLE 14

Aspheric Coefficients

| | Surface # | | | |
|---|---|---|---|---|
| | 2 | 3 | 5 | 6 |
| k = | −2.9780E+00 | 2.9913E+01 | −3.0000E+01 | −6.1946E+00 |
| A4 = | −2.3625E−01 | −3.3462E−01 | −7.4073E−01 | −2.1365E−01 |
| A6 = | 3.4574E+00 | 7.5634E−01 | −6.9703E−01 | 2.0237E−01 |
| A8 = | −2.0863E+01 | −2.5463E+00 | 8.2879E+00 | −2.0466E−01 |
| A10 = | 5.3216E+01 | 3.4406E+00 | −4.3892E+01 | 1.3535E−01 |
| A12 = | −4.4781E+01 | −1.5102E+00 | 9.7113E+01 | −5.2391E−02 |
| A14 = | | | −8.8882E+01 | 8.7521E−03 |

In the photographing lens assembly according to the 7th embodiment, the definitions of f, Fno, HFOV, V1, V2, CT1, CT2, R1, R2, f1, and f2 are the same as those stated in the 1st embodiment with corresponding values for the 7th embodiment. Moreover, these parameters can be calculated from Table 13 and Table 14 as the following values and satisfy the following relationships:

8th Embodiment

Figure 15:
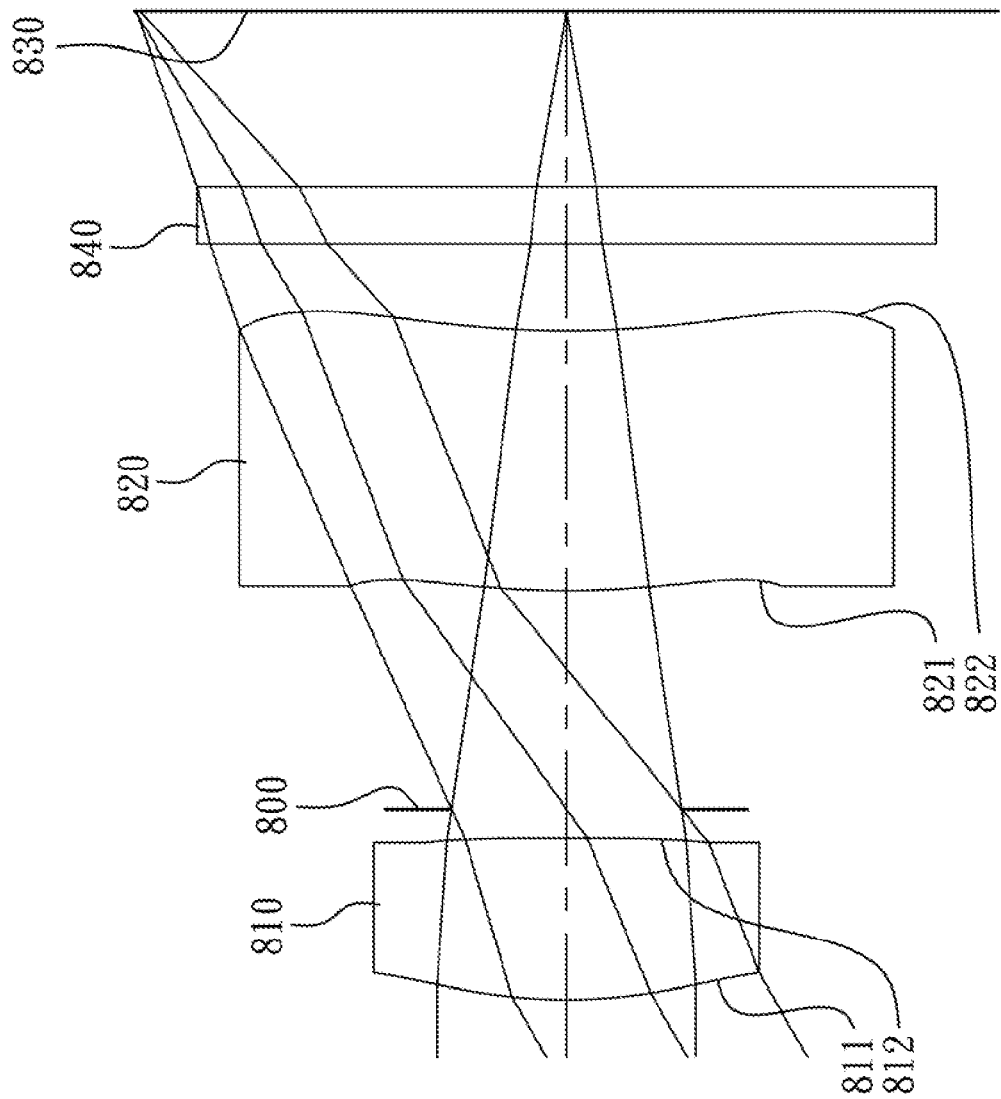
FIG. 15 is a schematic view of a photographing lens assembly according to the 8th embodiment of the present disclosure.
Figure 16:
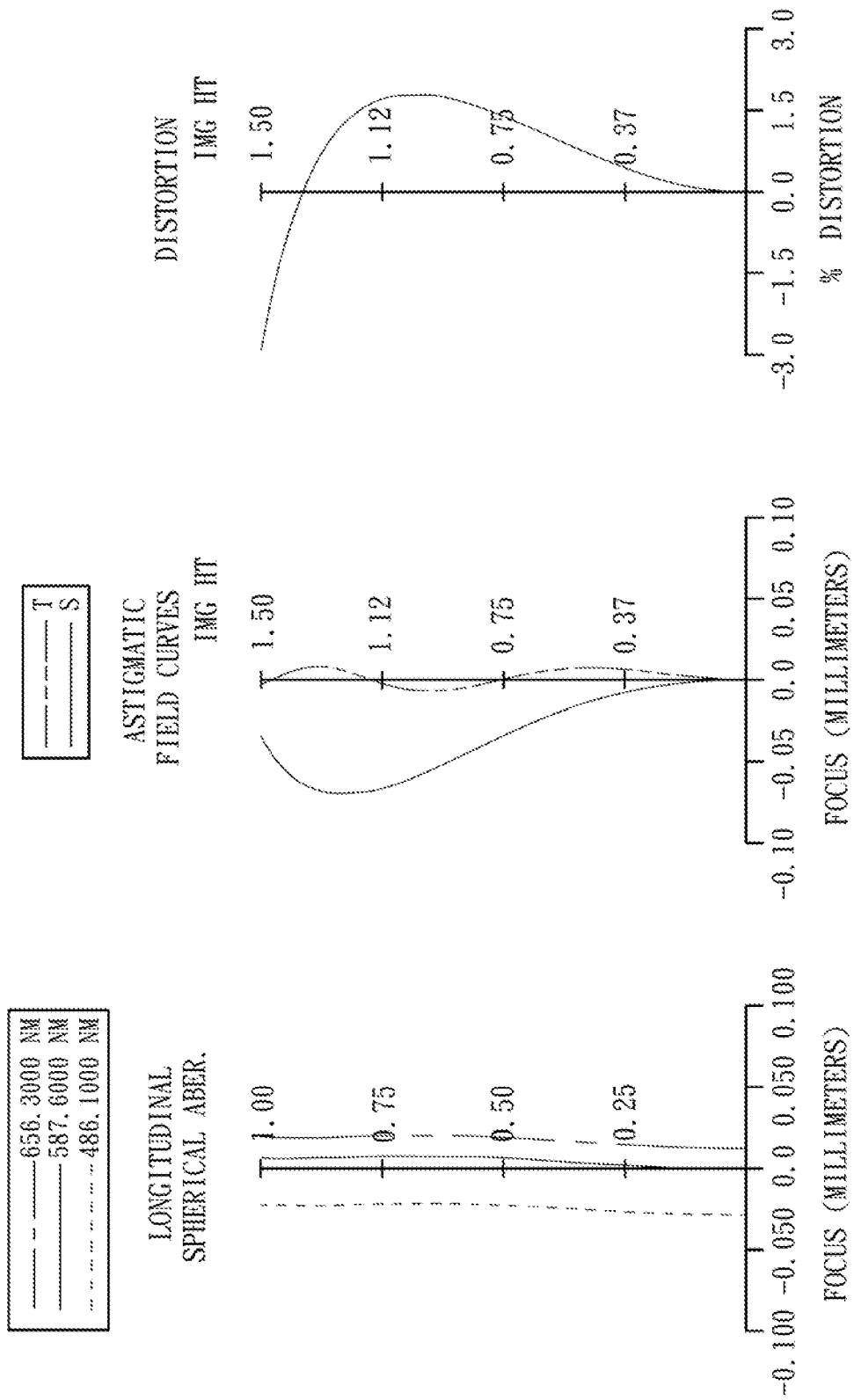
FIG. 16 shows spherical aberration curves, astigmatic field curves and a distortion curve of the photographing lens assembly according to the 8th embodiment.

FIG. 15 is a schematic view of a photographing lens assembly according to the 8th embodiment of the present disclosure. FIG. 16 shows spherical aberration curves, astigmatic field curves and a distortion curve of the photographing lens assembly according to the 8th embodiment. In FIG. 15, the photographing lens assembly includes, in order from an object side to an image side, the first lens element 810, an aperture stop 800, the second lens element 820, an IR-cut filter 840, and an image plane 830.

The first lens element 810 with positive refractive power has an object-side surface 811 and an image-side surface 812, and is made of plastic material. The object-side surface 811 and the image-side surface 812 of the first lens element 810 are convex at a paraxial region thereof, and the object-side surface 811 and the image-side surface 812 of the first lens element is 810 are aspheric.

The second lens element 820 with positive refractive power has an object-side surface 821 and an image-side surface 822, and is made of plastic material. The object-side surface 821 of the second lens element 820 is convex at a paraxial region thereof, the image-side surface 822 of the second lens element 820 is concave at the paraxial region and is convex at a peripheral region thereof, and the object-side surface 821 and the image-side surface 822 of the second lens element 820 are aspheric.

The IR-cut filter 840 is made of glass and located between the second lens element 820 and the image plane 830, and will not affect the focal length of the photographing lens assembly.

The detailed optical data of the 8th embodiment are shown in Table 15, and the aspheric surface data are shown in Table 16 below.

TABLE 15

8th Embodiment
f = 2.70 mm, Fno = 3.00, HFOV = 29.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.805 (ASP) | 0.563 | Plastic | 1.530 | 55.8 | 3.32 |
| 2 | | −58.864 (ASP) | 0.100 | | | | |
| 3 | Ape. Stop | Plano | 0.761 | | | | |

TABLE 15-continued

8th Embodiment
f = 2.70 mm, Fno = 3.00, HFOV = 29.8 deg.

| Surface # | | Curvature Radius | Thickness | Material | Index | Abbe # | Focal length |
|---|---|---|---|---|---|---|---|
| 4 | Lens 2 | 2.812 (ASP) | 0.905 | Plastic | 1.583 | 30.2 | 15.60 |
| 5 | | 3.586 (ASP) | 0.300 | | | | |
| 6 | IR-cut filter | Plano | 0.200 | Glass | 1.517 | 64.2 | — |
| 7 | | Plano | 0.609 | | | | |
| 8 | Image | Plano | — | | | | |

Note:
Reference wavelength (d-line) is 587.6 nm.

TABLE 16

Aspheric Coefficients

| | Surface # | | | |
|---|---|---|---|---|
| | 1 | 2 | 4 | 5 |
| k = | −4.1011E+00 | −1.0000E+02 | 3.8977E+00 | 1.4084E+00 |
| A4 = | −1.7076E−02 | −1.7508E−01 | −2.0375E−01 | 7.0549E−03 |
| A6 = | −1.4650E−01 | −2.2063E−01 | 1.3417E−01 | −1.5977E−01 |
| A8 = | −2.4094E−01 | −2.0840E−01 | −1.3686E+00 | 1.0028E−01 |
| A10 = | 7.3965E−01 | 1.7471E+00 | 3.1317E+00 | −4.8945E−02 |
| A12 = | −1.3943E+00 | −1.3939E+00 | −3.0519E+00 | 1.6473E−02 |
| A14 = | 7.0426E−01 | −9.6263E−06 | 2.0465E−01 | −7.8777E−03 |
| A16 = | | | | 1.6093E−03 |

In the photographing lens assembly according to the 8th embodiment, the definitions of f, Fno, HFOV, V1, V2, CT1, CT2, R1, R2, f1, and f2 are the same as those stated in the 1st embodiment with corresponding values for the 8th embodiment. Moreover, these parameters can be calculated from Table 15 and Table 16 as the following values and satisfy the following relationships:

| f (mm) | 2.70 | R1/f | 0.67 |
|---|---|---|---|
| Fno | 3.00 | (R1 + R2)/(R1 − R2) | −0.94 |
| HFOV (deg.) | 29.8 | f/f2 | 0.17 |
| (V1² − V2²)/(V1 − V2)² | 3.36 | f/f1 + f/|f2| | 0.99 |
| CT2/CT1 | 1.61 | | |

9th Embodiment

Figure 17:
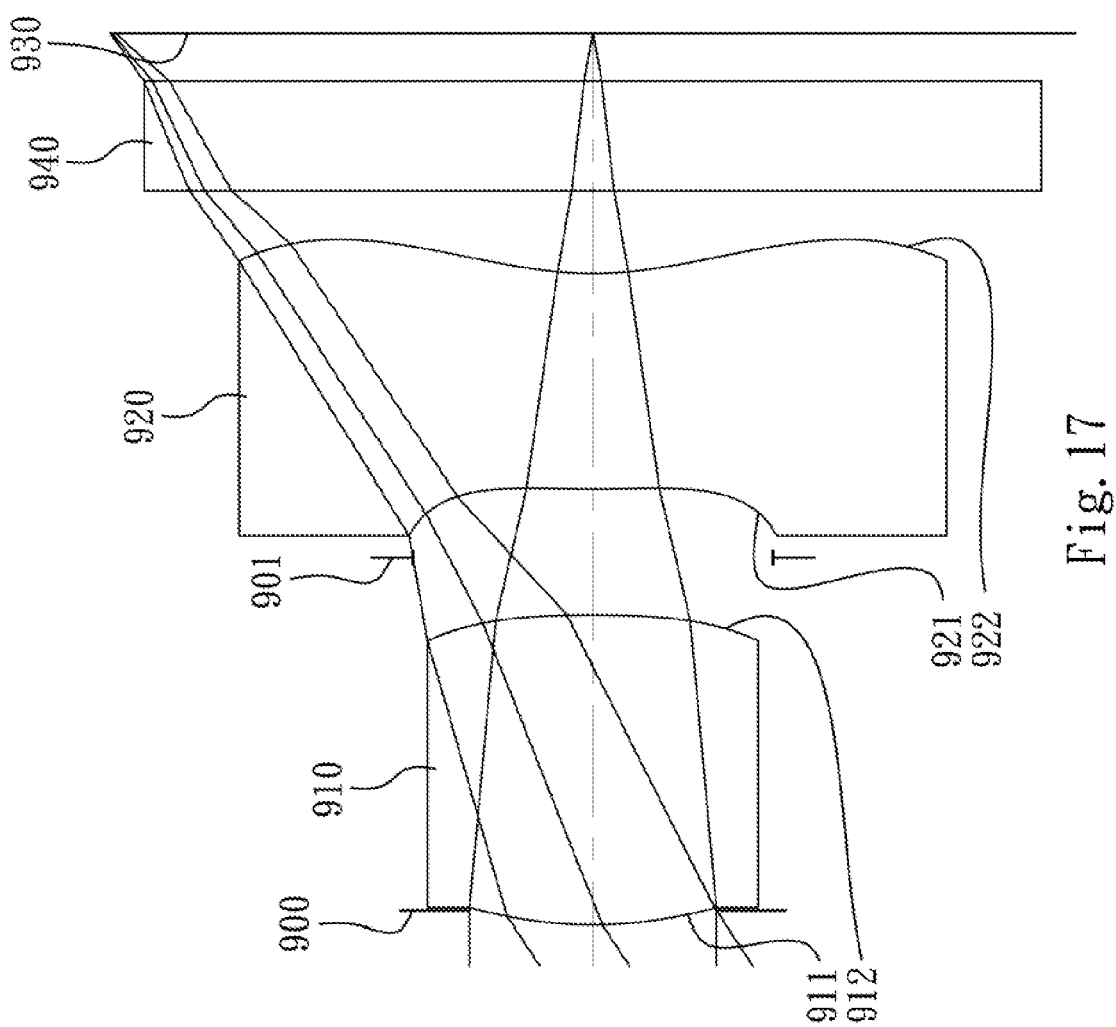
FIG. 17 is a schematic view of a photographing lens assembly according to the 9th embodiment of the present disclosure.
Figure 18:
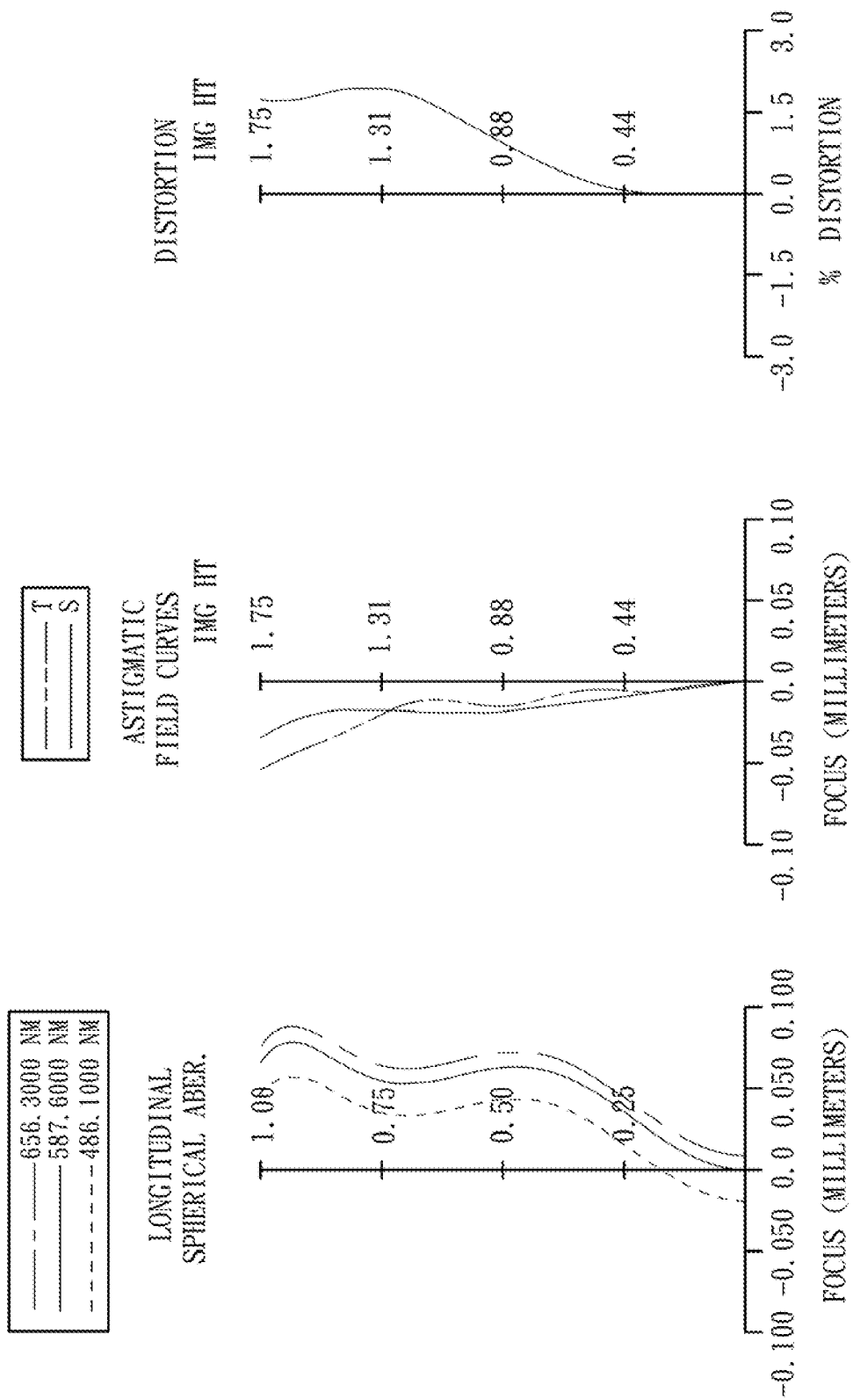
FIG. 18 shows spherical aberration curves, astigmatic field curves and a distortion curve of the photographing lens assembly according to the 9th embodiment.

FIG. 17 is a schematic view of a photographing lens assembly according to the 9th embodiment of the present disclosure. FIG. 18 shows spherical aberration curves, astigmatic field curves and a distortion curve of the photographing lens assembly according to the 9th embodiment. In FIG. 17, the to photographing lens assembly includes, in order from an object side to an image side, an aperture stop 900, the first lens element 910, a stop 901, the second lens element 920, an IR-cut filter 940, and an image plane 930.

The first lens element 910 with positive refractive power has an object-side surface 911 and an image-side surface 912, and is made of glass material. The object-side surface 911 and the image-side surface 912 of the first lens element 910 are convex at a paraxial region thereof, and the object-side surface 911 and the image-side surface 912 of the first lens element 910 are aspheric.

The second lens element 920 with negative refractive power has an object-side surface 921 and an image-side surface 922, and is made of plastic material. The object-side surface 921 of the second lens element 920 is convex at a paraxial region thereof, the image-side surface 922 of the second) lens element 920 is concave at the paraxial region and is convex at a peripheral region thereof, and the object-side surface 921 and the image-side surface 922 of the second lens element 920 are aspheric.

The IR-cut filter 940 is made of glass and located between the second lens element 920 and the image plane 930, and will not affect the focal length of the photographing lens assembly.

The detailed optical data of the 9th embodiment are shown in Table 17, and the aspheric surface data are shown in Table 18 below.

TABLE 17

9th Embodiment
f = 2.52 mm, Fno = 2.80, HFOV = 33.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.052 | | | | |
| 2 | Lens 1 | 1.519 (ASP) | 1.130 | Glass | 1.542 | 62.9 | 2.16 |
| 3 | | −3.813 (ASP) | 0.208 | | | | |

TABLE 17-continued

9th Embodiment
f = 2.52 mm, Fno = 2.80, HFOV = 33.6 deg.

| Surface # | | Curvature Radius | Thickness | Material | Index | Abbe # | Focal length |
|---|---|---|---|---|---|---|---|
| 4 | Stop | Plano | 0.250 | | | | |
| 5 | Lens 2 | 5.621 (ASP) | 0.785 | Plastic | 1.583 | 30.2 | −3.19 |
| 6 | | 1.324 (ASP) | 0.300 | | | | |
| 7 | IR-cut filter | Plano | 0.400 | Glass | 1.517 | 64.2 | — |
| 8 | | Plano | 0.174 | | | | |
| 9 | Image | Plano | — | | | | |

Note:
Reference wavelength (d-line) is 587.6 nm.
Effective radius of Surface 4 is 0.655 mm.

TABLE 18

Aspheric Coefficients

| | Surface # | | | |
|---|---|---|---|---|
| | 2 | 3 | 5 | 6 |
| k = | −3.1073E+00 | 2.9693E+01 | −2.1781E+01 | −6.9281E+00 |
| A4 = | −2.4062E−01 | −3.3346E−01 | −7.5129E−01 | −2.0680E−01 |
| A6 = | 3.4263E+00 | 7.7150E−01 | −7.5961E−01 | 1.9378E−01 |
| A8 = | −2.0961E+01 | −2.5063E+00 | 8.3546E+00 | −2.0260E−01 |
| A10 = | 5.3883E+01 | 3.5133E+00 | −4.3666E+01 | 1.3602E−01 |
| A12 = | −4.4781E+01 | −1.1763E+00 | 9.7510E+01 | −5.2423E−02 |
| A14 = | | | −8.9778E+01 | 8.5947E−03 |

In the photographing lens assembly according to the 9th embodiment, the definitions of f, Fno, HFOV, V1, V2, CT1, CT2, R1, R2, f1 and f2 are the same as those stated in the 1st embodiment with corresponding values for the 9th embodiment. Moreover, these parameters can be calculated from Table 17 and Table 18 as the following values and satisfy the following relationships:

| f (mm) | 2.52 | R1/f | 0.60 |
|---|---|---|---|
| Fno | 2.80 | (R1 + R2)/(R1 − R2) | −0.43 |
| HFOV (deg.) | 33.6 | f/f2 | −0.79 |
| $(V1^2 - V2^2)/(V1 - V2)^2$ | 2.85 | $|f/f1 + f/|f2||$ | 1.95 |
| CT2/CT1 | 0.69 | | |

It will be apparent to those skilled in the art that various modifications and variations can be made to the structure of the present disclosure without departing from the scope or spirit of the disclosure. In view of the foregoing, it is intended that the present disclosure cover modifications and variations of this invention provided they fall within the scope of the following claims.

What is claimed is:

1. A photographing lens assembly comprising, in order from an object side to an image side:
    a first lens element with positive refractive power having an object-side surface and an image-side surface, wherein the object-side surface and the image-side surface of the first lens element are convex at a paraxial region thereof; and
    a second lens element with negative refractive power made of plastic material, and having an object-side surface and an image-side surface, wherein the object-side surface of the second lens element is convex at a paraxial region thereof, the image-side surface of the second lens element is concave at the paraxial region and convex at a peripheral region thereof, and the object-side surface and the image-side surface of the second lens element are aspheric;
    wherein a central thickness of the first lens element is CT1, a central thickness of the second lens element is CT2, an Abbe number of the first lens element is V1, an Abbe number of the second lens element is V2, and the following relationships are satisfied:

$0.60 < CT2/CT1 < 4.0$; and $2.0 < (V1^2 - V2^2)/(V1 - V2)^2 < 5.0$.

2. The photographing lens assembly of claim 1, wherein the Abbe number of the first lens element is V1, the Abbe number of the second lens element is V2, and the following relationship is satisfied:

$2.0 < (V1^2 - V2^2)/(V1 - V2)^2 < 3.0$.

3. The photographing lens assembly of claim 1, wherein the Abbe number of the first lens element is V1, the Abbe number of the second lens element is V2, and the following relationship is satisfied:

$2.0 < (V1^2 - V2^2)/(V1 - V2)^2 < 2.5$.

4. The photographing lens assembly of claim 1, wherein a curvature radius of the object-side surface of the first lens element is R1, a curvature radius of the image-side surface of the first lens element is R2, and the following relationship is satisfied:

$-1.0 < (R1+R2)/(R1-R2) < -0.1$.

5. The photographing lens assembly of claim 4, wherein a focal length of the photographing lens assembly is f, a focal length of the second lens element is f2, and the following relationship is satisfied:

$-1.0 < f/f2 < 0$.

6. The photographing lens assembly of claim 4, wherein the central thickness of the first lens element is CT1, the central thickness of the second lens element is CT2, and the following relationship is satisfied:

$$1.30 < CT2/CT1 < 4.0.$$

7. The photographing lens assembly of claim 1, wherein a focal length of the photographing lens assembly is f, a focal length of the first lens element is f1, a focal length of the second lens element is f2, and the following relationship is satisfied:

$$0.9 < f/f1 + f/|f2| < 2.1.$$

8. The photographing lens assembly of claim 7, wherein the object-side surface and the image-side surface of the first lens element are aspheric, and the first lens element is made of plastic material.

9. The photographing lens assembly of claim 7, wherein a curvature radius of the object-side surface of the first lens element is R1, a curvature radius of the image-side surface of the first lens element is R2, and the following relationship is satisfied:

$$-1.0 < (R1+R2)/(R1-R2) < -0.25.$$

10. The photographing lens assembly of claim 7, wherein the central thickness of the first lens element is CT1, the central thickness of the second lens element is CT2, and the following relationship is satisfied:

$$1.50 < CT2/CT1 < 4.0.$$

* * * * *